United States Patent
Yano

(10) Patent No.: US 11,098,775 B2
(45) Date of Patent: Aug. 24, 2021

(54) CALIPER DEVICE AND DISC BRAKE DEVICE INCLUDING THE SAME

(71) Applicant: NABTESCO CORPORATION, Tokyo (JP)

(72) Inventor: Masataka Yano, Kobe (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 15/244,454

(22) Filed: Aug. 23, 2016

(65) Prior Publication Data

US 2017/0058977 A1    Mar. 2, 2017

(30) Foreign Application Priority Data

Aug. 24, 2015 (JP) .............................. JP2015-164989
Aug. 5, 2016 (JP) .............................. JP2016-154805

(51) Int. Cl.
| | | |
|---|---|---|
| *F16D 65/00* | (2006.01) | |
| *B61H 5/00* | (2006.01) | |
| *F16D 55/224* | (2006.01) | |
| *F16D 55/00* | (2006.01) | |

(52) U.S. Cl.
CPC ........... *F16D 65/0006* (2013.01); *B61H 5/00* (2013.01); *F16D 55/2245* (2013.01); *F16D 65/0068* (2013.01); *F16D 2055/0016* (2013.01)

(58) Field of Classification Search
CPC ............. F16D 65/0006; F16D 65/0068; F16D 55/2245; F16D 2055/0016; B61H 5/00
See application file for complete search history.

(56) References Cited

U.S. PATENT DOCUMENTS

| | | | | |
|---|---|---|---|---|
| 3,989,126 A | * | 11/1976 | Katzer | ..................... B61H 5/00 |
| | | | | 188/206 R |
| 4,013,144 A | * | 3/1977 | Lauzier | ..................... B62L 1/12 |
| | | | | 188/24.22 |
| 4,019,608 A | * | 4/1977 | Johnson | .............. F16D 55/2245 |
| | | | | 188/59 |
| 4,263,990 A | * | 4/1981 | Yoshigai | ................. F16D 65/46 |
| | | | | 188/24.19 |

(Continued)

FOREIGN PATENT DOCUMENTS

| | | |
|---|---|---|
| DE | 4407293 C1 | 10/1995 |
| DE | 296 13 732 U1 | 9/1996 |

(Continued)

OTHER PUBLICATIONS

Office Action Taiwanese Patent Application No. 105125857 dated May 23, 2017.

(Continued)

*Primary Examiner* — Melody M Burch
(74) *Attorney, Agent, or Firm* — Pillsbury Winthrop Shaw Pittman, LLP

(57) ABSTRACT

A caliper device used together with a brake shoe to retard rotation of a rotor includes a brake arm that is swung relative to a main body by a driving mechanism. The brake arm moves the brake shoe between a brake position and a non-brake position. The caliper device further includes a friction mechanism that increases friction against a swinging movement of the brake arm relative to the main body.

6 Claims, 17 Drawing Sheets

(56) References Cited

U.S. PATENT DOCUMENTS

| | | | | |
|---|---|---|---|---|
| 5,547,047 A * | 8/1996 | Kohar | ............... | B61H 5/00 |
| | | | | 188/205 A |
| 2003/0213665 A1* | 11/2003 | Min | ............... | A47C 1/06 |
| | | | | 188/322.19 |
| 2011/0290594 A1* | 12/2011 | Tsai | ............... | B60T 7/108 |
| | | | | 188/24.22 |

FOREIGN PATENT DOCUMENTS

| | | |
|---|---|---|
| EP | 1 270 980 A1 | 1/2003 |
| EP | 2078658 A1 | 7/2009 |
| JP | 2009162340 A | 7/2009 |
| JP | 2010-164183 A | 7/2010 |

OTHER PUBLICATIONS

Extended European Search Report as issued in European Patent Application No. 16185318.9, dated Jan. 30, 2017.
Notice of Reasons for Refusal dated Jun. 9, 2020 issued in corresponding Japanese Patent Application No. 2016-154805 with English translation (8 pages).

* cited by examiner

CALIPER DEVICE AND DISC BRAKE DEVICE INCLUDING THE SAME

CROSS-REFERENCE TO RELATED APPLICATIONS

This application is based on and claims the benefit of priority from Japanese Patent Application Serial Nos. 2015-164989 (filed on Aug. 24, 2015) and 2016-154805 (filed on Aug. 5, 2016), the contents of which are hereby incorporated by reference in their entirety.

TECHNICAL FIELD

The present invention relates to a caliper device and a brake device including the same.

BACKGROUND

A disc brake device that applies a braking force to a wheel by forcing a brake shoe(s) against a disc rotor which rotates together with an axle supporting the wheel of a railroad car has been known. A typical disc brake device may include a caliper device. The caliper device may include a driving mechanism that drives the brake shoe hydraulically or pneumatically and a brake arm that is coupled to the driving mechanism and swings around an arm pivot shaft such that the brake shoe is displaced close to or away from the disc rotor by the driving mechanism (see, for example, Japanese Patent Application Publication No. 2010-164183 (the "'183 Publication")).

The disc brake device (or the caliper device provided therein) disclosed in the '183 Publication includes a friction mechanism that is configured to prevent a brake shoe mount from rocking freely with respect to the brake arm.

SUMMARY

Meanwhile, vibration generated when a railroad car travels is transmitted to a caliper device. Therefore in a conventional caliper device, the vibration is also transmitted to the brake arm and the brake shoe mount and consequently the vibration may swings the brake arm and the brake shoe mount. When the conventional caliper device does not apply braking force to a wheel, the disc rotor and the brake shoe are supposed to be separated from each other but the vibration transmitted to the caliper device may cause the brake shoe to contact with the disc rotor repeatedly. Such contacts may result in noise and failure of the brake shoe.

In the caliper device disclosed in the '183 Publication, the friction mechanism restricts the swinging movements of the brake shoe mount so that the frequency of the brake shoe's contacts with the disc rotor can be reduced.

One object of the invention is to provide a caliper device and a disc brake device equipped with a new structure that decrease a frequency of brake shoe's contacts with a rotor.

(1) According to one aspect of the invention, provided is a caliper device used together with a brake shoe that retards the rotation of a rotor. The caliper device includes a brake arm that is swung relative to a main body by a driving mechanism. The brake arm moves the brake shoe between a brake position and a non-brake position. The caliper device further includes a friction mechanism that increases friction against a swinging movement of the brake arm relative to the main body.

According to the caliper device, the swinging movement of the brake arm is minimized or restricted due to the friction increased by the friction mechanism and thereby it is possible to hold the brake shoe at a non-brake position when braking is not performed. For example, it is possible to limit the swinging movement of the brake arm caused by vibration of the railroad car when braking is not performed and thus it is possible to prevent the brake shoe from contacting the rotor when braking is not performed.

(2) The friction mechanism may include a friction member that generates an arm holding friction force to impede the swinging movement of the brake arm relative to the main body.

(3) The friction mechanism may be configured to adjust the magnitude of the arm holding friction force incrementally or non-incrementally.

(4) The caliper device may include an adjustment means configured to adjust a position where the friction member is fixed in order to adjust the magnitude of the arm holding friction force.

(5) In some examples, the caliper device may further include an arm pivot shaft that couples the brake arm swingably to the main body. The friction member of the friction mechanism sliding-contacts one of the arm pivot shaft, the main body or the brake arm to generate the arm holding friction force.

(6) In some examples, the brake shoe is one of first and second brake shoes that sandwich the rotor, the brake arm is one of first and second arms coupled to the first and second brake shoes respectively, and the friction mechanism increases only the friction against the swinging movement of the one of the first and second brake arms relative to the main body. According to this caliper device, it is possible to prevent excessive limitation of the swinging movements of the pair of brake arms.

(7) In some examples, the caliper device may further include the driving mechanism supported by the main body. The driving mechanism includes a fixed structure and a movable structure, The one of the first and second brake arms is coupled to the fixed structure of the driving mechanism, and other of the first and second brake arms is coupled to the movable structure of the driving mechanism. According to this caliper device, the friction mechanism limits the swinging movement of the brake arm coupled to the fixed structure of the driving mechanism that has an inertial force larger than that of the movable structure so that the swinging movement of the brake arm can be efficiently restricted.

(8) In some examples, the brake arm includes an insertion portion into which an arm pivot shaft supported by the main body is inserted, an input portion that extends from the insertion portion, and an output portion that extends from the insertion portion in a direction different from a direction in which the input portion extends. The driving mechanism is coupled to input portion to impart a drive force to the input portion. The output portion is coupled to a brake shoe mount through a brake shoe pivot shaft that has a pivot axis, the brake shoe is attached to the brake shoe mount. The friction mechanism is a drive-side friction mechanism that applies a friction force to at least one selected from the group consisting of the input portion, the insertion portion, the output portion, the main body and the arm pivot shaft. The caliper device further comprising: a brake-side friction mechanism different from the drive-side friction mechanism. The brake-side friction mechanism applies a friction force to at least one selected from the group consisting of the output portion, the brake shoe pivot shaft, and the brake shoe mount.

According to this caliper device, besides the limitation of the relative movement between the brake arm and the brake shoe mount with the friction force imparted by the brake-side friction mechanism, the swinging movement of the brake arm is restricted by the friction force imparted by the drive-side friction mechanism. In this way it is possible to restrict the swinging movement of the brake arm around the pivot axis of the arm pivot shaft due to the vibration of the railroad car, and it is also possible to restrict the swinging movement of the brake shoe mount around the pivot axis of the brake shoe pivot shaft. Consequently it is possible to prevent the brake shoe from contacting the disc rotor repeatedly due to the vibration of the railroad car. Therefore the frequency of the brake shoe contacting the disc rotor can be reduced.

(9) In some examples, the friction mechanism is disposed closer to the input portion with reference to the arm pivot shaft.

In a reference example where the friction mechanism is disposed closer to the output section with reference to the arm pivot shaft, the distance between the disc rotor and the arm pivot shaft needs to be increased for a space where the friction mechanism is disposed in order to avoid interference between the friction mechanism and the disc rotor. Consequently the size of the caliper device may be increased for the reference example.

On the contrary, in the caliper device according to the disclosure, the friction mechanism is not disposed between the disc rotor and the arm pivot shaft so that the distance between the disc rotor and the arm pivot shaft is not increased. Consequently it is possible to prevent the increase in the size of the caliper device.

(10) In some examples, the friction member is attached to the main body and has a friction surface that is pressed against the brake arm or the arm pivot shaft.

According to this caliper device, the friction member is attached to the main body that is one of the components of the caliper device so that a separate part especially used for attaching the friction member is not necessary. Consequently it is possible to reduce the number of components used in the friction mechanism.

(11) In some examples, the friction member is attached to one of the brake arm and the arm pivot shaft and the friction member has a friction surface that is pressed against other of the brake arm and the arm pivot shaft.

According to this caliper device, the friction member is attached to the brake arm or the arm pivot shaft that is one of the components of the caliper device so that a separate part especially used for attaching the friction member is not necessary. Consequently it is possible to reduce the number of components used in the friction mechanism.

(12) In some examples, the friction member is attached to the brake arm or the arm pivot shaft, and has a friction surface that is pressed against the main body.

According to this caliper device, the friction member is attached to the brake arm or the arm pivot shaft that is one of the components of the caliper device so that a separate part especially used for attaching the friction member is not necessary. Consequently it is possible to reduce the number of components used in the friction mechanism.

(13) In some examples, the friction member has a friction surface that is pressed against the arm pivot shaft.

According to this caliper device, the main body and the brake arm do not necessarily have configurations especially made for the friction member to be pressed against them so that it is possible to prevent complication of the configurations of the main body and the brake arm.

(14) In some examples, the friction mechanism further includes a pressing member that presses the friction member against the arm pivot shaft.

According to this caliper device, the friction member is pressed against the arm pivot shaft by the pressing member so that the frequency of the friction member moving away from the arm pivot shaft is decreased. Consequently it is possible to impart the friction force to the arm pivot shaft in a stable manner.

(15) In some examples, the friction member and the pressing member are supported and housed in a housing portion formed in the main body or the brake arm, and the friction mechanism further includes a plug that plugs the housing portion.

According to this caliper device, the friction member and the pressing member are disposed in the sealed internal space so that it is possible to prevent foreign substances from entering between the friction member and a component that contacts the friction member. As a result, it is possible to prevent the friction force from being changed by the foreign substances. Consequently, the friction force generated by the friction mechanism can be stabilized.

(16) In some examples, the plug has an attachment portion where the pressing member is attached.

For example, considering a case where a plurality of disc springs are disposed on top of each other to form the pressing member, when a worker attaches the friction mechanism to the caliper device, the disc springs are firstly inserted in the housing portion and then the plug is attached to the housing portion. However, according to this attachment method, the worker cannot see the stack of the disc springs from the outside of the housing portion because the housing portion is plugged with the plug. Therefore the worker finds it difficult to check the number of the disc springs. On the contrary, in the caliper device according to the disclosure, the pressing member is attached to the attachment portion of the plug so that the worker can easily see the stack of the disc spring Therefore the worker who performs the attachment can easily check the number of the disc springs. Consequently it is possible to prevent the friction mechanism that includes an inappropriate number of the disc springs from being attached to the caliper device.

(17) In some examples, the housing portion includes a step portion that contacts the plug in a direction in which the plug is inserted.

According to this caliper device, positioning of the plug is performed by contacting the plug with the step portion of the housing portion. Accordingly, it is possible to improve the efficiency of the attachment process of the friction mechanism.

(18) In some examples, the brake-side friction mechanism is disposed closer to the insertion portion with reference to the brake shoe pivot shaft.

According to this caliper device, compared to a reference example where the brake-side friction mechanism is disposed on the opposite side to the insertion portion with reference to the brake shoe pivot shaft, the brake-side friction mechanism can be placed on the inner side of the caliper device. Consequently the size increase of the caliper device can be prevented.

(19) In some examples, the brake-side friction mechanism includes a friction member attached to one of the brake shoe mount and the brake shoe pivot shaft and pressed against other of the brake shoe mount and the brake shoe pivot shaft.

According to this caliper device, the friction member is attached to the brake shoe mount or the brake shoe pivot shaft that is one of the components of the caliper device so that a separate part especially used for attaching the friction member is not necessary. Consequently it is possible to reduce the number of components used in the brake-side friction mechanism.

(20) In some examples, the brake-side friction mechanism includes a friction member attached to one of the brake shoe mount and the output portion and pressed against other of the brake shoe mount and the output portion.

According to this caliper device, the friction member is attached to the brake shoe mount or the output portion that is one of the components of the caliper device so that a separate part especially used for attaching the friction member is not necessary. Consequently it is possible to reduce the number of components used in the brake-side friction mechanism.

(21) In some examples, the brake-side friction mechanism includes a friction member attached to one of the output portion and the brake shoe pivot shaft and pressed against other of the output portion and the brake shoe pivot shaft.

According to this caliper device, the friction member is attached to the output portion or the brake shoe pivot shaft that is one of the components of the caliper device so that a separate part especially used for attaching the friction member is not necessary. Consequently it is possible to reduce the number of components used in the brake-side friction mechanism.

(22) In some examples, the brake-side friction mechanism includes a friction member that is pressed against the brake shoe pivot shaft.

According to this caliper device, the brake shoe mount and the brake arm do not necessarily have configurations especially made for the friction member to be pressed against them so that it is possible to prevent complication of the configurations of the brake shoe mount and the brake arm.

(23) In some examples, the brake-side friction mechanism further includes a pressing member that presses the friction member of the brake-side friction mechanism against the brake shoe pivot shaft.

According to this caliper device, the friction member is pressed against the brake shoe pivot shaft by the pressing member so that the frequency of the friction member moving away from the brake shoe pivot shaft is decreased. Consequently it is possible to apply the friction force to the brake shoe pivot shaft in a stable manner.

(24) In some examples, the friction member of the brake-side friction mechanism is supported and housed in a housing portion formed in the brake shoe mount or the brake arm, and the brake-side friction mechanism further includes a plug that plugs the housing portion.

According to this caliper device, the friction member is disposed in the sealed internal space so that it is possible to prevent foreign substances from entering between the friction member and a component that contacts the friction member. As a result, it is possible to prevent the friction force from being changed by the foreign substances. Consequently, the friction force generated by the friction mechanism can be stabilized.

(25) In some examples, the brake-side friction mechanism further includes a pressing member that presses the friction member of the brake-side friction mechanism against the brake shoe pivot shaft, and the plug of the brake-side friction mechanism has an attachment portion where the pressing member of the brake-side friction mechanism is attached.

For example, considering a case where a plurality of disc springs are disposed on top of each other to form the pressing member, when a worker attaches the brake-side friction mechanism to the caliper device, the disc springs are firstly inserted in the housing portion and then the plug is attached to the housing portion. However, according to this attachment method, the worker cannot see the stack of the disc springs from the outside of the housing portion because the housing portion is plugged with the plug. Therefore the worker finds it difficult to check the number of the disc springs. On the contrary, in the caliper device according to the disclosure, the pressing member is attached to the attachment portion of the plug so that the worker can easily see the stack of the disc spring Therefore the worker who performs the attachment can easily check the number of the disc springs. Consequently it is possible to prevent the brake-side friction mechanism that includes an inappropriate number of the disc springs from being attached to the caliper device.

(26) In some examples, the housing portion of the brake-side friction mechanism includes a step portion that contacts the plug in a direction in which the plug is inserted.

According to this caliper device, positioning of the plug is performed by contacting the plug with the step portion of the housing portion. Accordingly, it is possible to improve the efficiency of the attachment process of the brake-side friction mechanism.

(27) A disc brake device according to one aspect of the invention includes the caliper device described above in at least one of (1)-(26) and the caliper device is configured to apply a braking force to the rotor when fluid is supplied from a fluid system.

This disc brake device can obtain the same advantageous effects as those described above in (1)-(26).

According to the aspects of the invention, provided is a caliper device and a disc brake device in which the frequency of contacts between a brake shoe and a disc rotor can be decreased.

DESCRIPTION OF THE EXEMPLARY EMBODIMENTS

One embodiment of a railway disc brake device will be now described with reference to the accompanying drawings.

Figure 1:
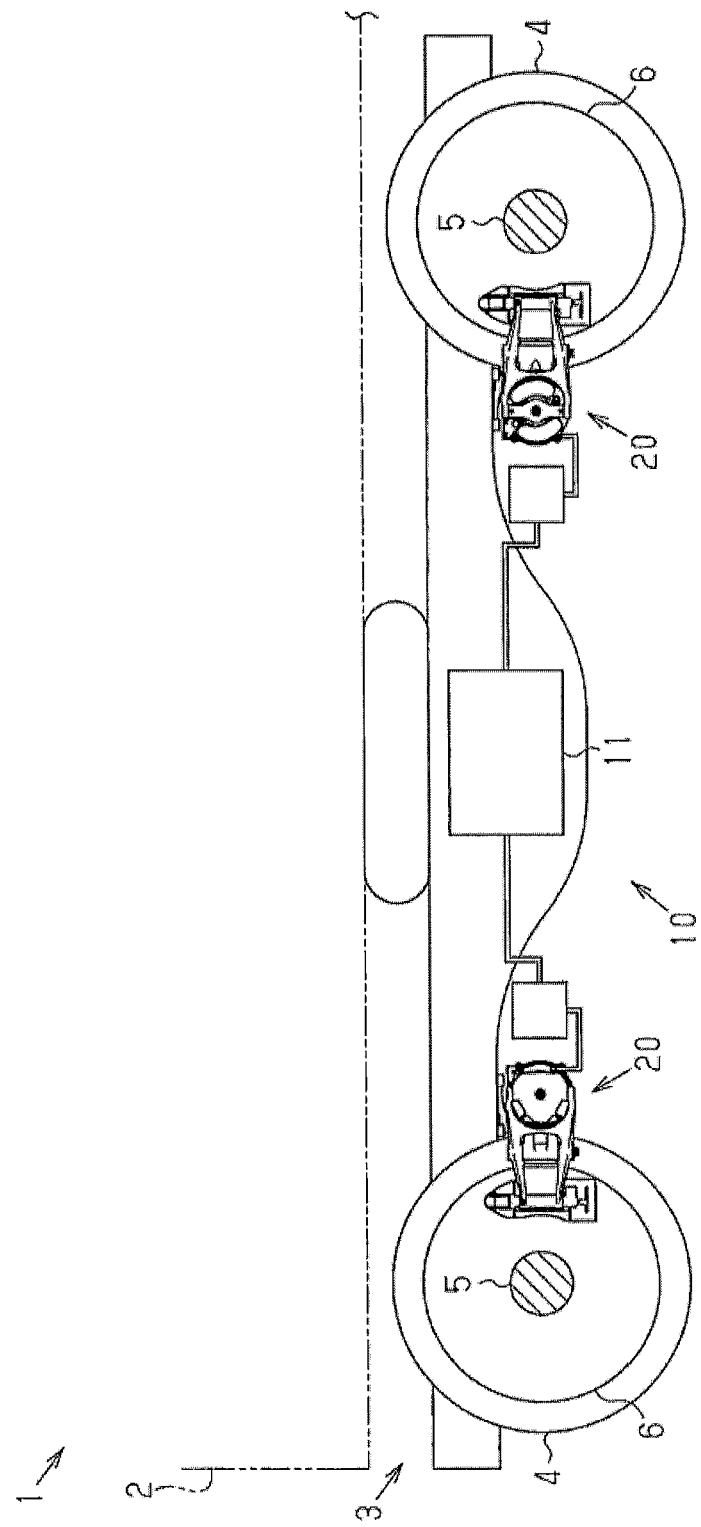
FIG. 1 is a schematic sectional view of a railroad car equipped with a disc brake device according to one embodiment viewed from an axle direction.

Referring to FIG. 1, a disc brake device 10 may be attached to a truck 3 that supports a chassis 2 of a railroad car 1. The disc brake device 10 is forced against a disc rotor 6 rotating together with an axle 5 that rotates a wheel 4 of the truck 3. In this manner, a braking force is applied to the wheel 4.

The disc brake device 10 may include an air ventilation unit 11 as a fluid system, and at least one caliper device 20 that is fluidically coupled to the air ventilation unit 11. The air ventilation unit 11 may be attached to, for example, the truck 3 to provide compressed air to the caliper device 20. The caliper device 20 presses the disc rotor 6 attached to, for example, the axle 5 with the compressed air. A single air ventilation unit 11 may be fluidically coupled to a plurality of the caliper devices 20. When a braking force is applied to the wheel 4, the air ventilation unit 11 provides compressed air to the caliper device(s) 20. Whereas when the braking force that has been applied to the wheel 4 is canceled and no braking force is applied, the air ventilation unit 11 exhausts the compressed air from the caliper device(s) 20. The disc brake device 10 may operate the caliper device(s) 20 by providing a gas other than the compressed air or other fluid such as hydraulic fluid to the caliper device(s) 20, instead of the compressed air provided by the air ventilation unit 11.

Figure 2:
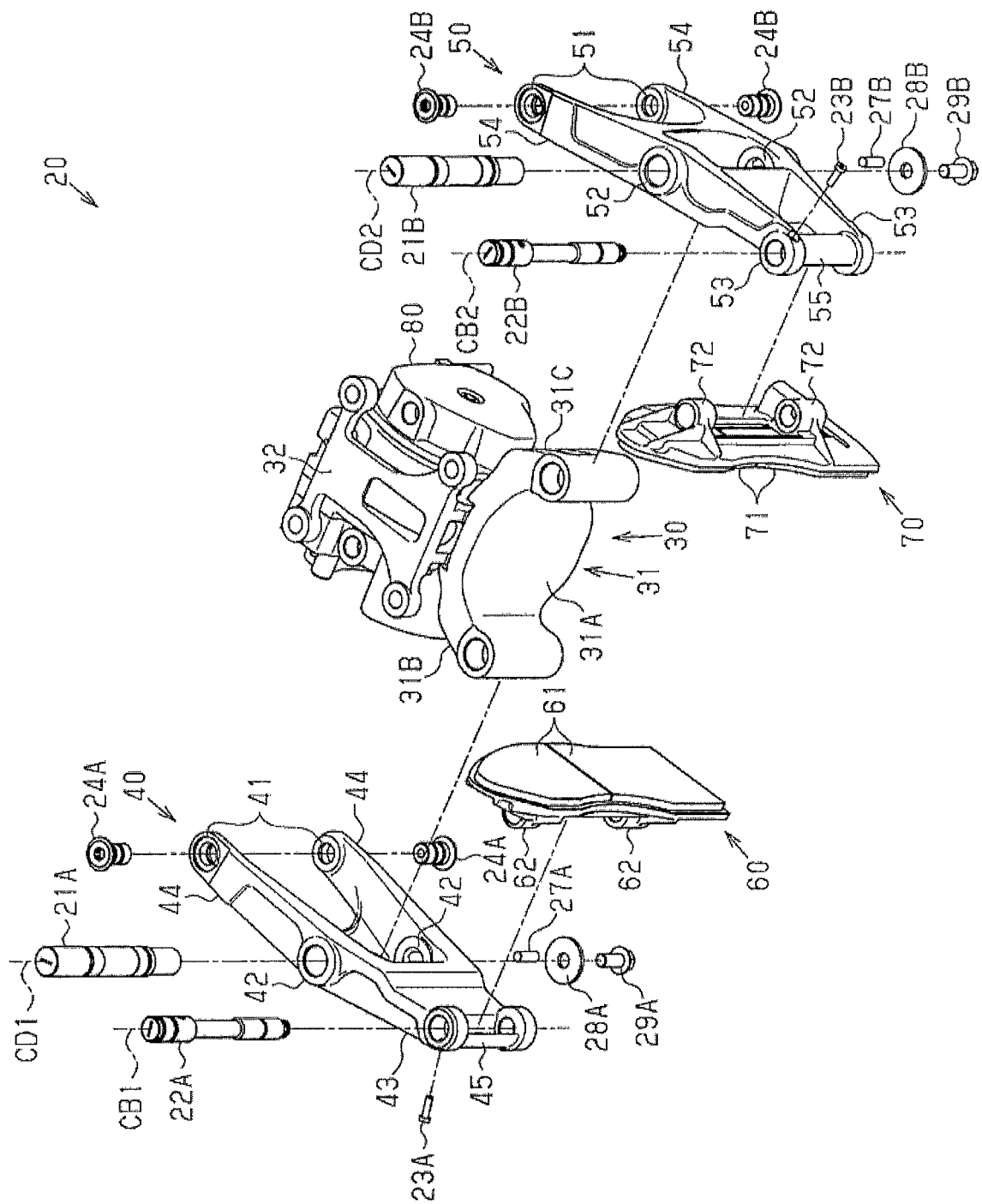
FIG. 2 is an exploded perspective view of a caliper device of a disc brake device.

Referring to FIG. 2, the caliper device 20 may include a main body 30 attached to the truck 3 (see FIG. 1), and a first brake arm 40 and a second brake arm 50 that are provided swingably with respect to the main body 30.

The main body 30 may include an bottom 31A and an arm support portion 31. The arm support portion 31 may include first and second arm portions 31B, 31C that extend continuously from each side of the bottom 31A to form a substantially U-shape. The bottom 31A may have an attached portion 32 where is to be attached to the truck 3 with four bolts (not shown) and that extends opposite to the first and second arm portions 31B, 31C. The first and second arm portions 31B, 31C correspond to an shaft support portion.

The first brake arm 40 may be coupled to the first arm portion 31B with an arm pivot shaft 21A that has a pivot axis CD1. The arm pivot shaft 21A may be able to revolve relative to the first arm portion 31B but not able to revolve relative to the first brake arm 40.

A pair of arms 41 of the first brake arm 40 may be separated from each other in the axial direction of the arm pivot shaft 21A and extend such that the arms 41 face to each other. An insertion portion 42 through which the arm pivot shaft 21A is inserted may be formed in each arm 41. A key member 27A may be inserted between the arm pivot shaft 21A and one of the insertion portions 42. In this manner, a relative rotation between the arm pivot shaft 21A and the first brake arm 40 may be inhibited. A washer 28A that covers an end face of the arm pivot shaft 21A in its axial direction and an end face of the insertion portion 42 may be fixed to the arm pivot shaft 21A with a bolt 29A. Thereby it is possible to prevent the key member 27A from falling off between the arm pivot shaft 21A and the insertion portion 42.

Each arm 41 may include an output portion 43 that extends from the insertion portion 42, and an input portion 44 that extends from the insertion portion 42 in a direction different from the output portion 43 (the opposite direction in the embodiment). At a tip of the output portion 43, a tip coupling portion 45 that couples the pair of arms 41 to each other may be formed.

A first brake shoe mount 60 may be coupled at the tip portion of the output portion 43 with a brake shoe pivot shaft 22A that has a pivot axis CB1 such that it moves swingably with respect to the output portion 43. The brake shoe pivot shaft 22A may be inserted into a pair of supporting portions 62 of the first brake shoe mount 60 and the tip coupling portion 45 of the first brake arm 40. The brake shoe pivot shaft 22A may be fixed to the tip coupling portion 45 with a bolt 23A such that the shaft 22A is unrotatable with respect to the tip coupling portion 45 and the shaft 22A may be also supported by a pair of supporting portions 62 such that it is rotatable with respect to the supporting portions 62.

The second brake arm 50 may be coupled to the second arm portion 31C with an arm pivot shaft 21B that has a pivot axis CD2. The arm pivot shaft 21B may be able to revolve relative to the second arm portion 31C but not able to revolve relative to the second brake arm 50.

A pair of arms 51 of the second brake arm 50 may have the same configuration as the pair of arms 41 of the first brake arm 40, and components of the second brake arm 50 are designated by the like reference numerals of the corresponding components of the first brake arm 40 such that the digit "4" in the tens place is replaced by "5".

Like the first brake arm 40 and the arm pivot shaft 21A, a key member 27B may be inserted between the arm pivot shaft 21B and an insertion portion 52 of the second brake arm 50. In this manner, a relative rotation between the arm pivot shaft 21B and the second brake arm 50 may be inhibited. A washer 28B may be fixed to the end portion of the arm pivot shaft 21B in the axial direction with a bolt 29B. Thereby it is possible to prevent the key member 27B from falling off between the arm pivot shaft 21B and the insertion portion 52.

A second brake shoe mount 70 may be coupled at the tip portion of the output portion 53 with a brake shoe pivot shaft 22B that has a pivot axis CB2 such that it moves swingably with respect to the output portion 53. The brake shoe pivot shaft 22B may be inserted into a pair of supporting portions 72 of the second brake shoe mount 70 and the tip coupling portion 55 of the second brake arm 50. The brake shoe pivot shaft 22B may be fixed to the tip coupling portion 55 with a bolt 23B such that the shaft 22B is unrotatable with respect to the tip coupling portion 55 and the shaft 22A may be also supported by a pair of supporting portions 72 such that it is rotatable with respect to the supporting portions 72.

Figure 3:
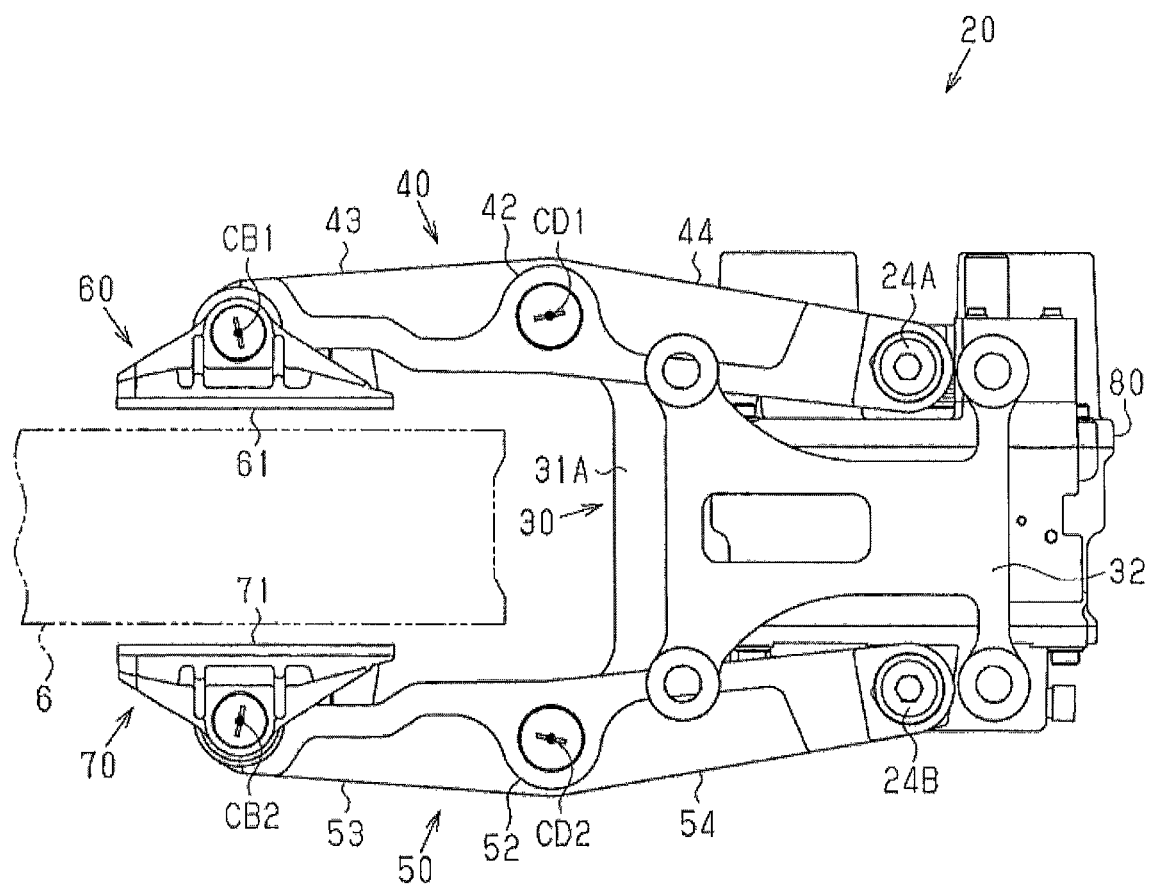
FIG. 3 is a plan view of the caliper device.

Referring to FIG. 3, the first brake arm 40 and the second brake arm 50 may be disposed at each side of the disc rotor 6 in the thickness direction of the disc rotor 6. The first brake shoe mount 60 and the second brake shoe mount 70 may be disposed to face the disc rotor 6 respectively in the thickness direction of the disc rotor 6. Brake shoes 61, 71 that are pressed and applied onto the disc rotor 6 may be attached to the brake shoe mount 60, 70 respectively.

A driving mechanism 80 may be attached to the tip portions of the input portions 44, 54 of the brake arms 40, 50 through fixing shafts 24A, 24B. The fixing shafts 24A, 24B may be fixed to the input portions 44, 54 and may be rotatably coupled to the driving mechanism 80. Accordingly the brake arms 40, 50 are able to swing with respect to the driving mechanism 80.

The driving mechanism 80 may impart a driving force to the input portions 44, 54 in response to compressed air provided from the air ventilation unit 11 (see FIG. 1) such that the tip portions of the input portions 44, 54 (fixing shafts 24A, 24B) are separated from each other. The driving mechanism 80 may include a return spring (not shown) that imparts, to the input portions 44, 54, a force that separates the brake shoe 61 from the disc rotor 6. When the air ventilation unit 11 exhausts the air while the brake shoes 61, 71 are applied on the disc rotor 6, the force applied to the input portion 44 by the return spring becomes larger than the force applied to the input portion 44 by the driving mechanism 80 based on the compressed air so that the brake shoe 61 moves away from the disc rotor 6.

Figure 4A:
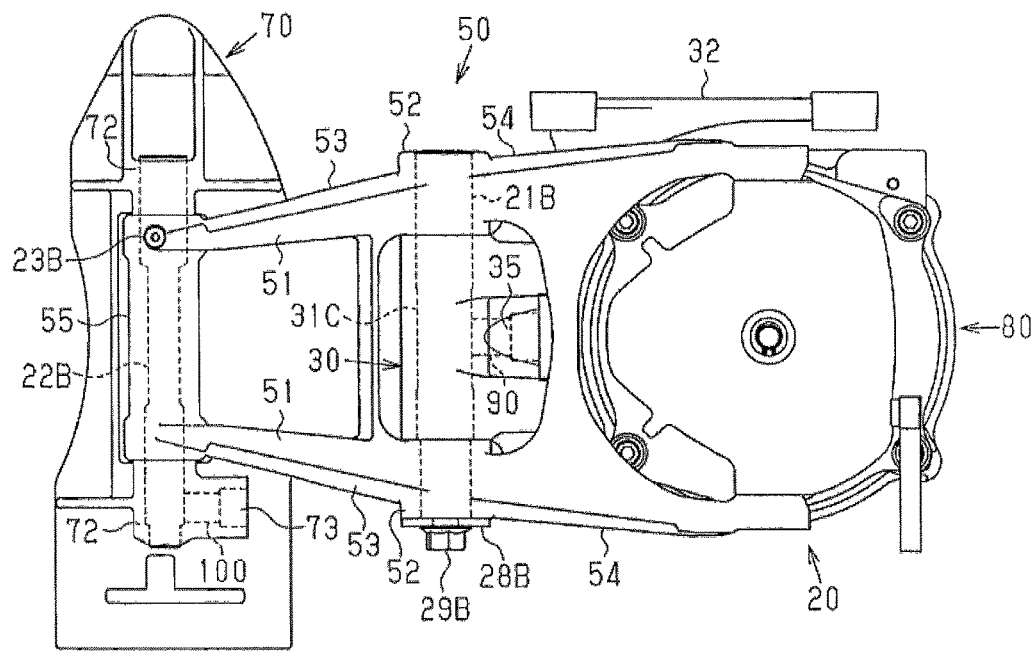
FIG. 4A is a side view of a caliper device and FIG. 4B is a side view of a caliper device disposed opposite to the caliper device of FIG. 4A.

Referring to FIG. 4A, in the main body 30, a drive-side friction mechanism 90 may be provided on the second arm portion 31C of the second brake arm 50. However, referring to FIG. 4B, the drive-side friction mechanism 90 is not provided on the first arm 31B of the first brake arm 40 in the main body 30. The drive-side friction mechanism 90 shown in FIG. 4A may restrict the swinging movement of the second brake arm 50 with respect to the main body 30 (the arm pivot shaft 21B) by applying friction force to the arm pivot shaft 21B. The drive-side friction mechanism 90 may be disposed closer to the input portion 54 with reference to the arm pivot shaft 21B (on the drive mechanism side) and between the pair of arms 51 in the axial direction of the arm pivot shaft 21B.

Figure 4B:
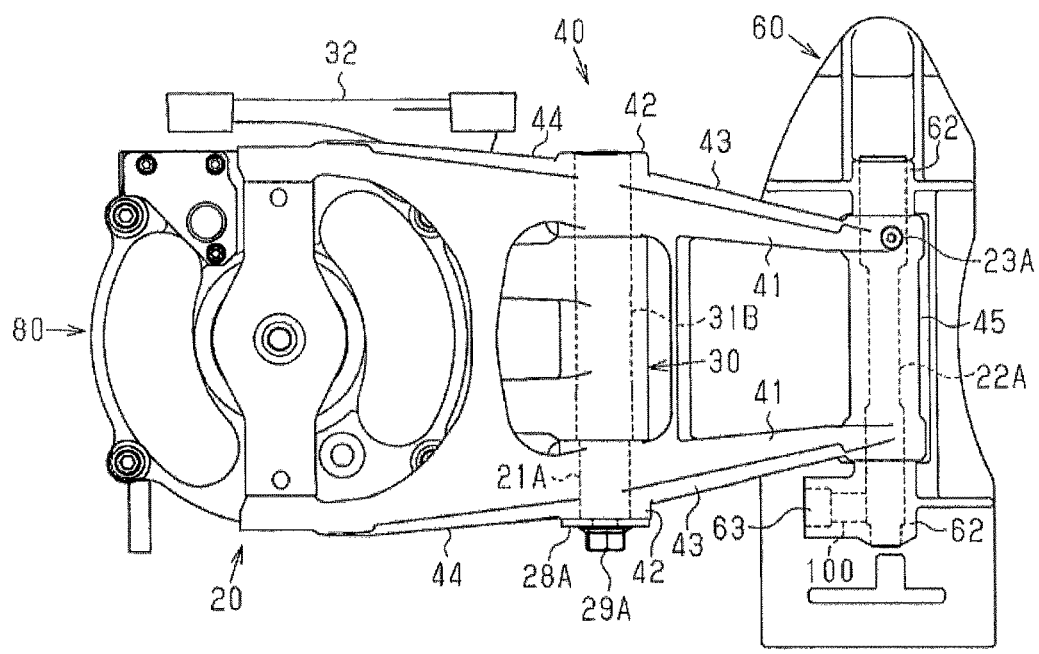

Referring to FIG. 4A, a brake-side friction mechanism 100 may be provided on one of the two supporting portions 72 of the second brake shoe mount 70. Referring to FIG. 4B, another brake-side friction mechanism 100 may be provided on one of the two supporting portions 62 of the first brake shoe mount 60.

Referring again to FIG. 4A, the brake-side friction mechanism 100 provided on the second brake shoe mount 70 may apply a friction force to the brake shoe pivot shaft 22B to limit the swinging movement of the second brake shoe mount 70 with respect to the brake shoe pivot shaft 22B (the output portion 53). In like wise manner, referring again to FIG. 4B, the brake-side friction mechanism 100 provided on the first brake shoe mount 60 may apply a friction force to the brake shoe pivot shaft 22A to limit the swinging movement of the first brake shoe mount 60 with respect to the brake shoe pivot shaft 22A (the output portion 43). The brake-side friction mechanisms 100 may be disposed closer to the insertion portions 42, 52 of the brake arms 40, 50 with reference to the brake shoe pivot shafts 22A, 22B respectively as shown in FIGS. 4A and 4B. More specifically, the brake-side friction mechanisms 100 may be disposed outside the pairs of arms 41, 51 of the brake arms 40, 50 respectively.

Structure of the drive-side friction mechanism 90 and components therearound, and structure of the brake-side friction mechanisms 100 and components therearound will be now described in detail with reference to FIGS. 5-8. Here, the structure of the brake-side friction mechanism 100 provided on the first brake shoe mount 60 is same as the brake-side friction mechanism 100 provided on the second brake shoe mount 70 so that the structure of the brake-side friction mechanism 100 provided on the first brake shoe mount 60 will be mainly described and the description of the brake-side friction mechanism 100 provided on the second brake shoe mount 70 will be omitted.

Figure 5:
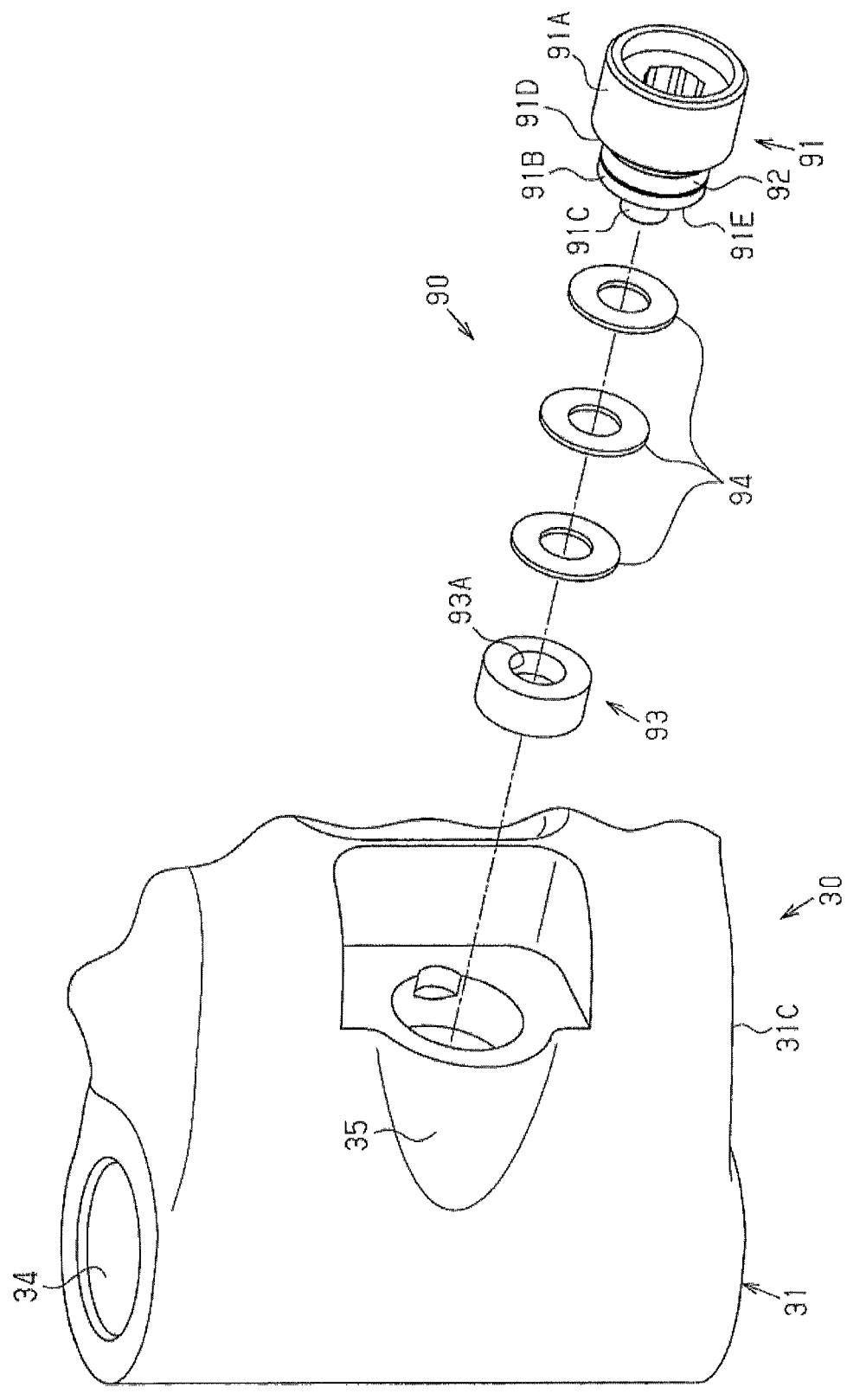
FIG. 5 is an exploded perspective view of a drive-side friction mechanism and components therearound in the caliper device.

Referring to FIG. 5, the driving-side friction mechanism 90 may include a plug 91 that is attached to the second arm portion 31C of the main body 30. A friction member 93 that has a friction surface, and at least one (for example, three) pressing member(s) 93 may be attached to the plug 91. The friction member 93 may have a bottomed cylindrical shape. The pressing member 94 may be, for example, a disc spring and sandwiched between the plug 91 and the friction member 93. The number of the pressing members 94 provided may be one, two, four or more.

On the plug 91, a cylindrical screw portion 91A, a columnar sealing portion 91B and a columnar attachment portion 91C may be sequentially formed. As shown in FIG. 5, the diameters of these portions sequentially decrease from the screw portion 91A, the sealing portion 91B and the attachment portion 91C in the stated order. Moreover, a first step portion 91D may be formed between the sealing portion 91B and the screw portion 91A, and a second step portion 91E may be formed between the sealing portion 91B and the attachment portion 91C. A male thread (not shown in FIG. 5) may be formed on the outer circumferential surface of the screw portion 91A. A seal 92 may be attached to the periphery of the sealing portion 91B. The seal 92 may be an O-ring.

Figure 6:
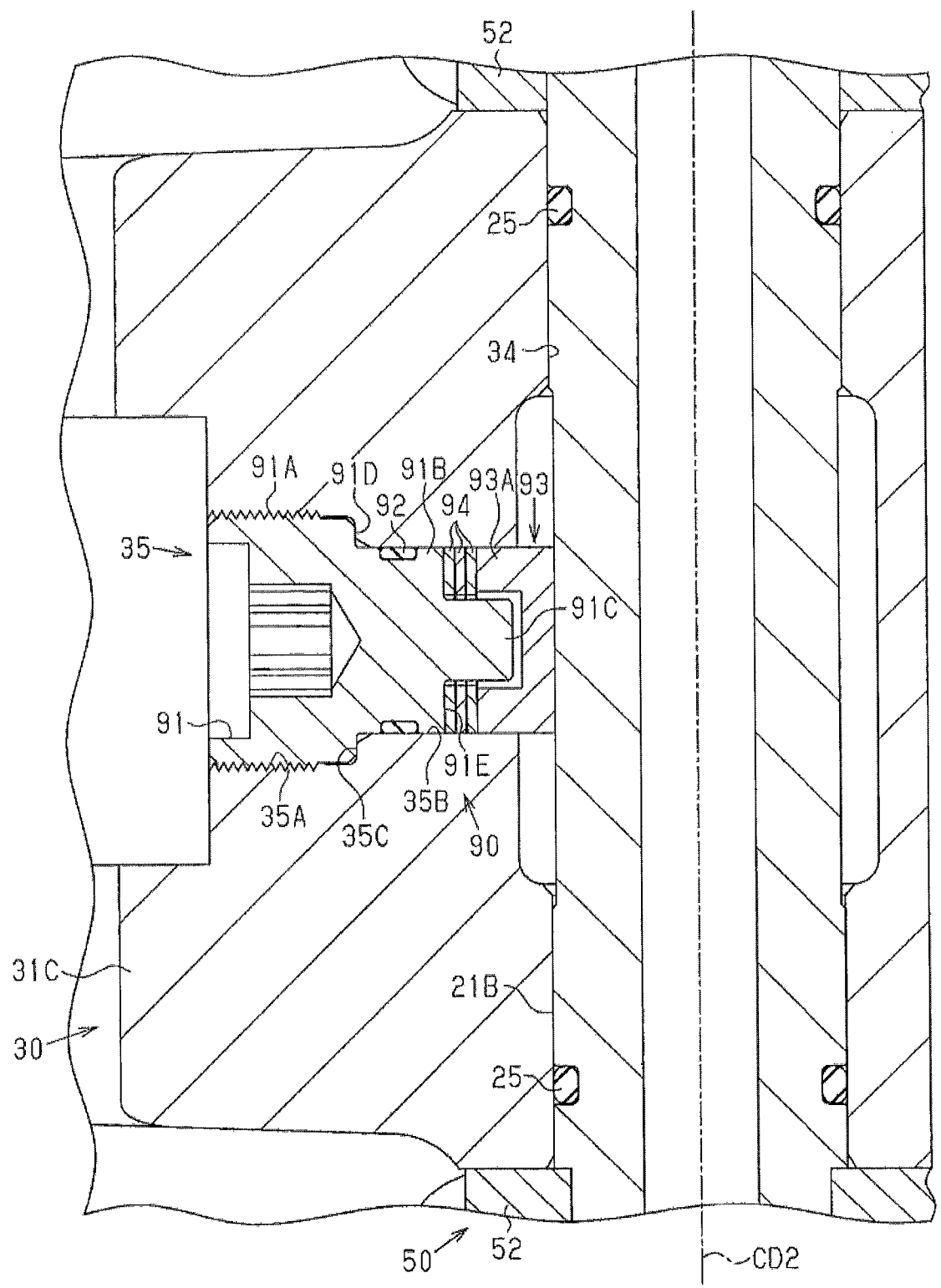
FIG. 6 is a sectional view of the drive-side friction mechanism and components therearound.

Referring to FIG. 6, a first housing portion 34 that houses the arm pivot shaft 21B may be formed in the second arm portion 31C of the main body 30. The first housing portion 34 may extend in the radial direction of the arm pivot shaft 21B. At the center of the first housing portion 34 in the axial direction of the arm pivot shaft 21B, a second housing portion 35 that houses the drive-side friction mechanism 90 may be formed. The second housing portion 35 may extend from the first housing portion 34 toward the driving mechanism with reference to the arm pivot shaft 21B (see FIG. 4A). The first housing portion 34 and the second housing portion 35 may each have an internal space that communicates with each other.

A portion of the arm pivot shaft 21B housed in the first housing portion 34 may have a pair of seals 25 at each end of the portion. The seals 25 may be, for example, O-rings. An area of the arm pivot shaft 21B between the pair of seals 25 may be filled with grease which is one type of lubricant.

The second housing portion 35 may include a thread portion 35A on which a female thread is formed, and a sealing portion 35B that is configured to have an inner diameter smaller than that of the thread portion 35A. A step portion 35C may be formed between the thread portion 35A and the sealing portion 35B.

When the drive-side friction mechanism 90 is attached to the second arm portion 31C of the main body 30, the plug 91 plugs the opening of the second housing portion 35 when the screw portion 91A is screwed to the thread portion 35A of the second housing portion 35. At this point, the first step portion 91D contacts the step portion 35C of the second housing portion 35. The sealing portion 91B of the plug 91 may be inserted into the sealing portion 35B of the second housing portion 35 and the gap between the sealing portion 91B and the sealing portion 35B is sealed with the seal 92. As for the first housing portion 34, the gap between the first housing portion 34 and the arm pivot shaft 21B may be sealed with the pair of seals 25 so that the internal spaces defined by the pair of seals 25 and the seal 92 of the plug 91 are sealed in the first and second housing portions 34, 35. The friction member 93 and the pressing member(s) 94 are disposed within the sealed internal spaces. The friction member 93 may be disposed closer to the arm pivot shaft with reference to the pressing member(s) 94.

The pressing member closest to the sealing portion 91B among the plurality of pressing members 94 may contact the second step portion 91E, and the pressing member closest to the friction member 93 among the plurality of pressing members 94 may contact the end face of a cylindrical portion 93A of the friction member 93.

Since the plurality of pressing members 94 are sandwiched between the plug 91 and the friction member 93 as shown in FIG. 6, the plurality of pressing members 94 are compressed. The plurality of pressing members 94 may push the friction member 93 toward the arm pivot shaft 21B so that the friction member 93 may be pressed against the arm pivot shaft 21B. A friction force generated by sliding contact between the friction surface of the friction member 93 and the arm pivot shaft 21B may be referred to as an arm holding friction force. The position to fix the friction member 93 and the magnitude of the arm holding friction force may be adjustable incrementally or non-incrementally depending on the number of the pressing members 94, the size and material of the pressing members 94, and/or the insertion depth of the plug 91 and the like. In the embodiment, the screw portion 91A of the plug 91 and/or the pressing members 94 are one example of an adjustment means to adjust the position where the friction member 93 is fixed.

Figure 7:
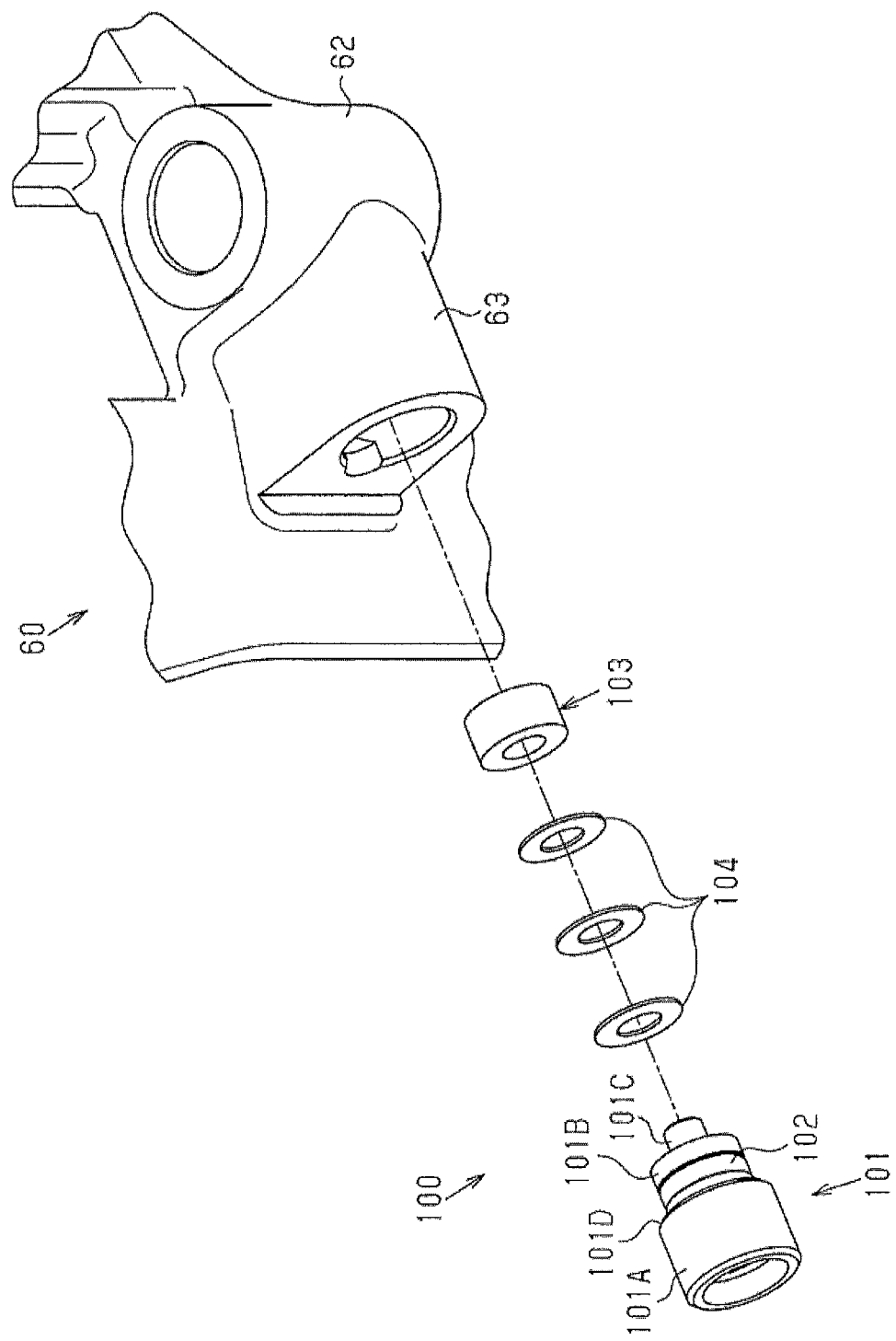
FIG. 7 is an exploded perspective view of a brake-side friction mechanism and components therearound disposed closer to a first brake arm in the caliper device.

Referring to FIG. 7, similarly to the drive-side friction mechanism 90, the brake-side friction mechanism 100 may include a plug 101, a friction member 103, and at least one (for example, three) pressing member(s) 104. The plug 101, the friction member 103, and the pressing member(s) 104 may have the same configuration as the plug 91, the friction member 93, and the pressing member(s) 94 of the drive-side friction mechanism 90 respectively (see FIG. 5). The number of the pressing members 104 provided may be one, two, four or more.

Figure 8:
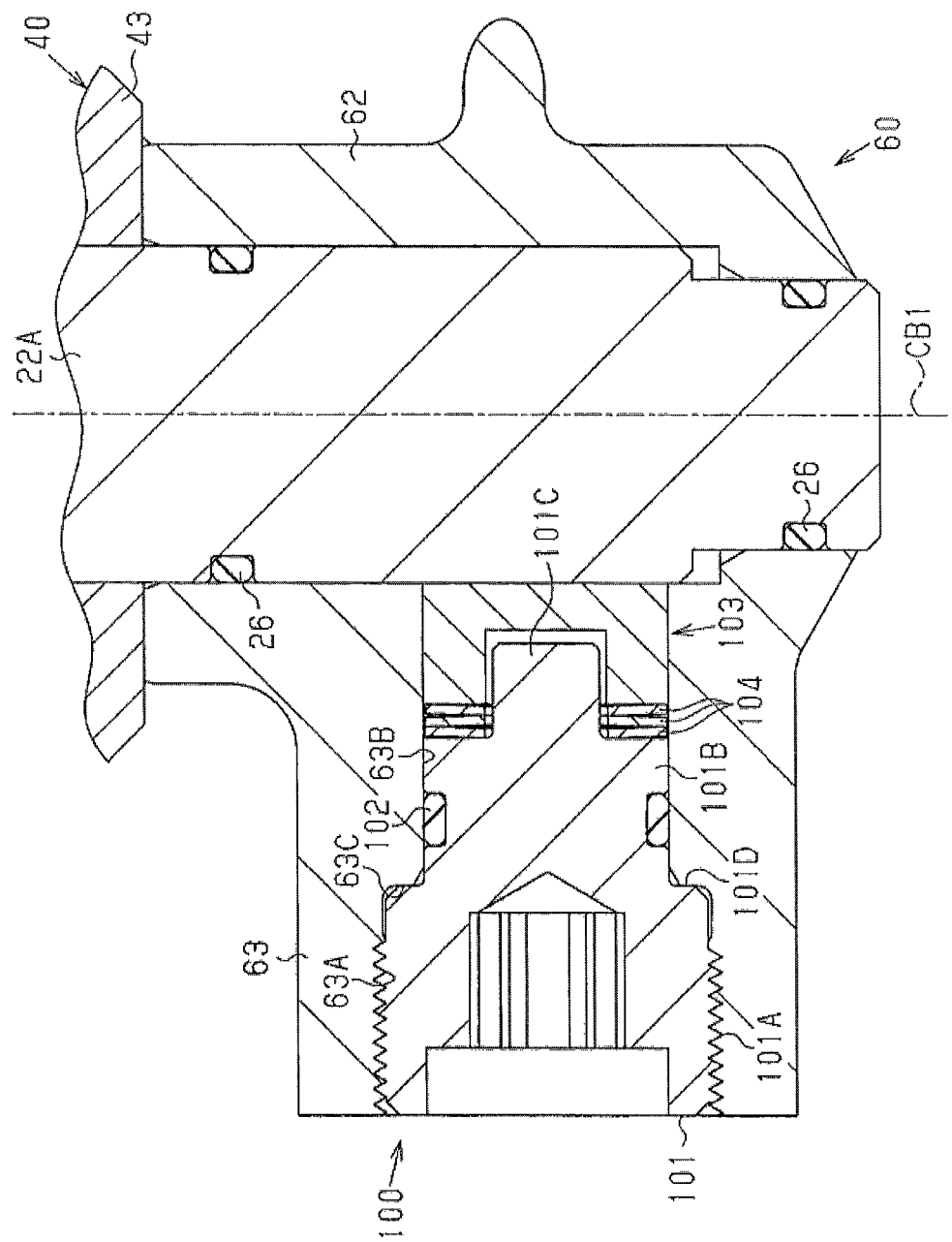
FIG. 8 is a sectional view of the brake-side friction mechanism and components therearound.

Referring to FIG. 8, a pair of seals 26 may be attached to portions of the brake shoe pivot shaft 22A where are inserted into the pair of supporting portions 62 respectively. Between the pair of seals 26 of the brake shoe pivot shaft 22A and the portions of the supporting portion 62 corresponding to the pair of seals 26, grease which is one type of lubricant may be provided.

A housing portion 63 where the brake-side friction mechanism 100 is housed may be formed on the supporting portion 62. The housing portion 63 may include a thread portion 63A on which a female thread is formed, and a sealing portion 63B that is configured to have an inner diameter smaller than that of the thread portion 63A. A step portion 63C may be formed between the thread portion 63A and the sealing portion 63B.

Referring to FIG. 8, a screw portion 101A, a sealing portion 101B and an attachment portion 101C may be sequentially formed on the plug 101. The plug 101 plugs the opening of the housing portion 63 when the screw portion 101A is screwed to the thread portion 63A of the housing portion 63. At this point, a first step portion 101D contacts the step portion 63C of the housing portion 63. The sealing portion 101B of the plug 101 may be inserted into the sealing portion 63B of the housing portion 63 and the gap between the sealing portion 101B and the sealing portion 63B is sealed with a seal 102 provided on the sealing portion 101B. The gap between the supporting portion 62 and the brake shoe pivot shaft 22A may be sealed with the pair of seals 26 so that the internal spaces defined by the pair of seals 26 and the seal 102 of the plug 101 are sealed in the housing portion 63 and the supporting portion 62. The friction member 103 and the pressing member(s) 104 are disposed within the sealed internal spaces. The friction member 103 may be disposed closer to the brake shoe pivot shaft 22A with reference to the pressing member(s) 104.

Since the three pressing members 104 are sandwiched between the plug 101 and the friction member 103 as shown in FIG. 8, the three pressing members 104 are compressed therebetween. The pressing members 104 may push the friction member 103 toward the brake shoe pivot shaft 22A so that the friction member 103 may be pressed against the brake shoe pivot shaft 22A.

How to attach the drive-side friction mechanism 90 to the main body 30 will be now described with reference to FIG. 9. Since how to attach the brake-side friction mechanism 100 to the brake shoe mounts 60, 70 respectively is same as how to attach the drive-side friction mechanism 90 to the main body 30, the description of the former will be hereunder omitted. Note that the thread portion 35A of the second housing portion 35 is schematically illustrated in FIG. 9 for the sake of simplicity.

Attachment of the drive-side friction mechanism 90 to the main body 30 may be performed after the main body 30 has been attached to the second brake arm 50 (see FIG. 2) through the arm pivot shaft 21B. The attachment process may include a friction member disposing step, a pressing member attaching step, and a plug attaching step.

Figure 9A:
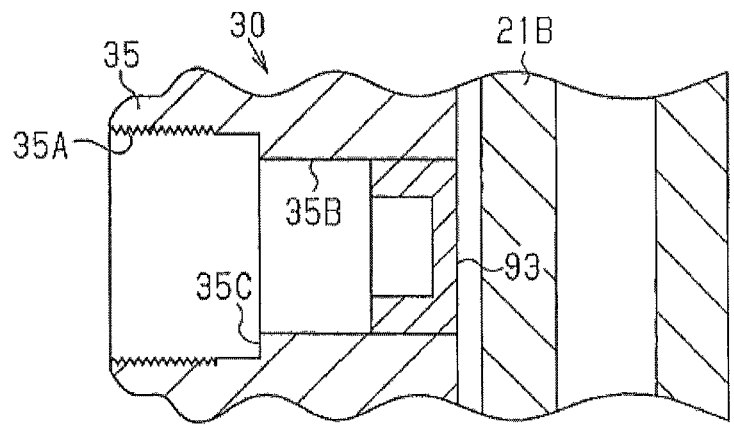
FIGS. 9A-9D are schematic sectional views of the drive-side friction mechanism and components therearound illustrating assembling steps of the drive-side friction mechanism.

Referring to FIG. 9A, in the friction member disposing step, the friction member 93 may be inserted into the sealing portion 35B of the second housing portion 35 in the main body 30.

Figure 9B:
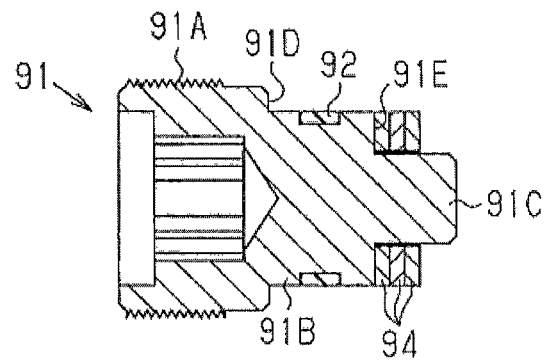

Referring to FIG. 9B, in the pressing member attaching step, the three pressing members 94 may be attached to the attachment portion 91C of the plug 91. At this point, a worker who performs the attachment process of the drive-side friction mechanism 90 to the main body 30 may check the number of pressing members 94 attached to the plug 91. In the state where the three pressing members 94 have been attached to the attachment portion 91C, the attachment portion 91C may protrude out from the three pressing members 94. In this way, it is possible to prevent the pressing members 94 from falling out of the attachment portion 91C.

Figure 9C:
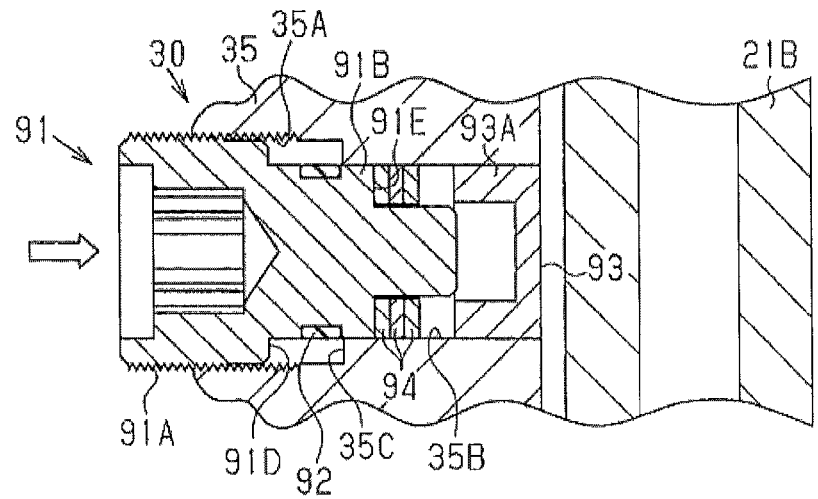
Figure 9D:
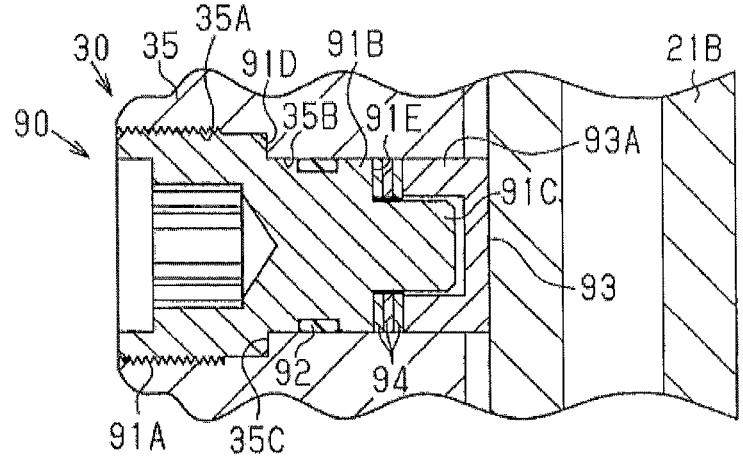

Finally in the plug attaching step, the screw portion 91A of the plug 91 to which the pressing members 94 have been attached may be screwed to the thread portion 35A of the second housing portion 35 as shown in FIG. 9C. In this manner, the plug 91 may be inserted in the direction indicated by the arrow in FIG. 9C into the second housing portion 35. When the screw portion 91A is screwed into the thread portion 35A, the tip of the attachment portion 91C of the plug 91 is inserted into the cylindrical portion 93A of the friction member 93 and the pressing member 94 contacts the cylindrical portion 93A of the friction member 93. In this way, the friction member 93 moves toward the arm pivot shaft 21B together with the plug 91. The friction member 93 contacts the arm pivot shaft 21B and any further movement of the friction member 93 toward the arm pivot shaft 21B is stopped but the plug 91 continues to move toward the arm pivot shaft 21B so that the three pressing members 94 are compressed. When the first step portion 91D of the plug 91 contacts the step portion 35C of the second housing portion 35 as illustrated in FIG. 9D, the worker stops screwing of the plug 91 into the second housing portion 35. Alternatively the plug 91 may be attached to the second housing portion 35 by press fitting, adhesive bonding or welding instead of screwing. As long as the plug 91 is adequately attached to the second housing portion 35, any attaching method may be adopted in addition to screwing. A method to attach the plug 101 to the housing portion 63 is also not limited to screwing.

Operation of the caliper device 20 will be described with reference to FIG. 10. In the following description, a swing direction of the brake arms 40, 50 when the brake shoe mounts 60, 70 move closer to the disc rotor 6 will be referred to as a "swing direction R1," whereas a swing direction of the brake arms 40, 50 when the brake shoe mounts 60, 70 move away from the disc rotor 6 will be referred to as a "swing direction R2." In the illustrated example, the driving mechanism 80 may include a movable structure, which may be a piston rod, and a fixed structure, which may be a cylinder. The brake arm 40 may be coupled to the movable structure of the driving mechanism 80 and the brake arm 50 may be coupled to the fixed structure of the driving mechanism 80. The fixed structure (for example, the cylinder) of the driving mechanism 80 may have a weight larger than that of the movable structure (for example, the piston rod) and have an inertia force larger than that of the movable structure.

Figure 10A:
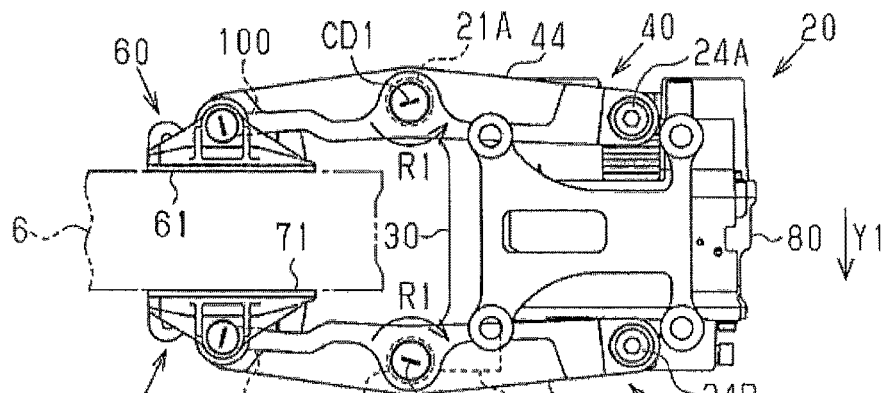
FIGS. 10A-10D are plan views illustrating an action of the caliper device.

Referring to FIG. 10A, the driving mechanism 80 drives the first brake arm 40 to swing in the swing direction R1 around the pivot axis CD1 of the arm pivot shaft 21A, and the driving mechanism 80 moves in the direction indicated by the arrow Y1 in FIG. 10A. Consequently the second brake arm 50 swings in the swing direction R1 around the pivot axis CD2 of the arm pivot shaft 21B. As a result, the distance between the tip of the input portion 44 and the tip of the input portion 54 (the distance between the fixing shaft 24A and the fixing shaft 24B) is increased. In this way the first and second brake shoe mounts 60, 70 move closer to the disc rotor 6, and the brake shoes 61, 71 are pressed against the disc rotor 6.

Figure 10B:
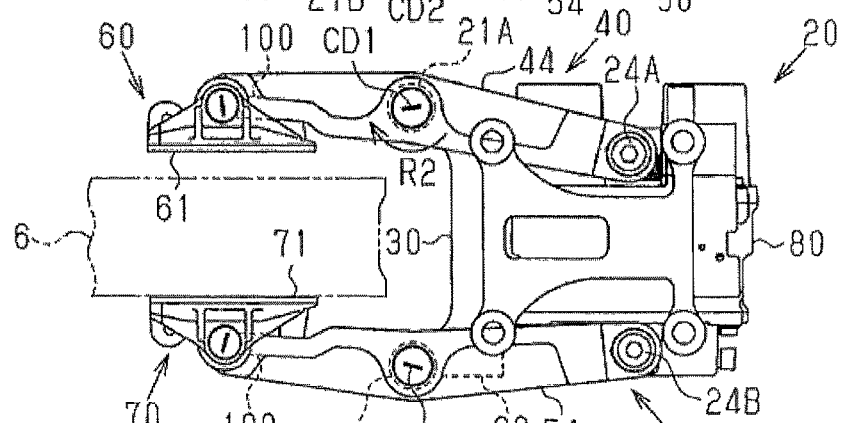

When the driving of the driving mechanism 80 is stopped and compressed air is exhausted from the driving mechanism 80 as illustrated in FIG. 10B, the first brake arm 40 swings in the swing direction R2 around the pivot axis CD1 of the arm pivot shaft 21A by the action of the return spring (not shown), and the driving mechanism 80 returns to the position where the driving mechanism 80 was situated before the first brake arm 40 was driven. Consequently, the first brake shoe mount 60 moves away from the disc rotor 6 and the brake shoe 61 moves away from the disc rotor 6. On the other hand, the second brake arm 50 does not swing in the swing direction R2 around the pivot axis CD2 of the arm pivot shaft 21B by the drive-side friction mechanism 90. Consequently the brake shoe 71 of the second brake shoe mount 70 keeps contacting with the disc rotor 6.

While the railroad car 1 (see FIG. 1) travels, the wheel 4 and the truck 3 (see FIG. 1) move relative to each other in the axle direction (the thickness direction of the disc rotor 6), the vertical direction and the front-rear direction due to the vibration generated when the railroad car 1 travels. Especially when the wheel 4 and the truck 3 move relatively in the axle direction, the brake arms 40, 50 that are supported by the main body 30 attached to the truck 3 move closer to and away from the disc rotor 6 so that the brake shoe mounts 60, 70 move closer to and away from the disc rotor 6.

Figure 10C:
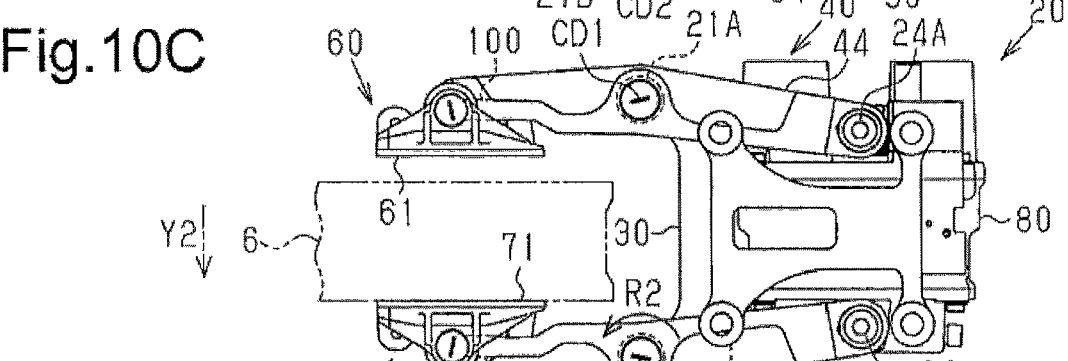

For example, when the disc rotor 6 moves in the direction indicated by the arrow Y2 as shown in FIG. 10C due to the vibration generated while the railroad car 1 travels, the brake shoe 71 of the second brake shoe mount 70 is pushed by the disc rotor 6. The second brake arm 50 swings in the swing direction R2 around the pivot axis CD2 of the arm pivot shaft 21B due to the force which the second brake shoe mount 70 receives from the disc rotor 6 through the brake shoe 71.

Moreover, the second brake arm 50 is restricted from swinging around the pivot axis CD2 of the arm pivot shaft 21B because of the drive-side friction mechanism 90. Therefore even when the vibration is generated while the railroad car 1 travels, the second brake arm 50 is maintained in the state illustrated in FIG. 10C.

Figure 10D:
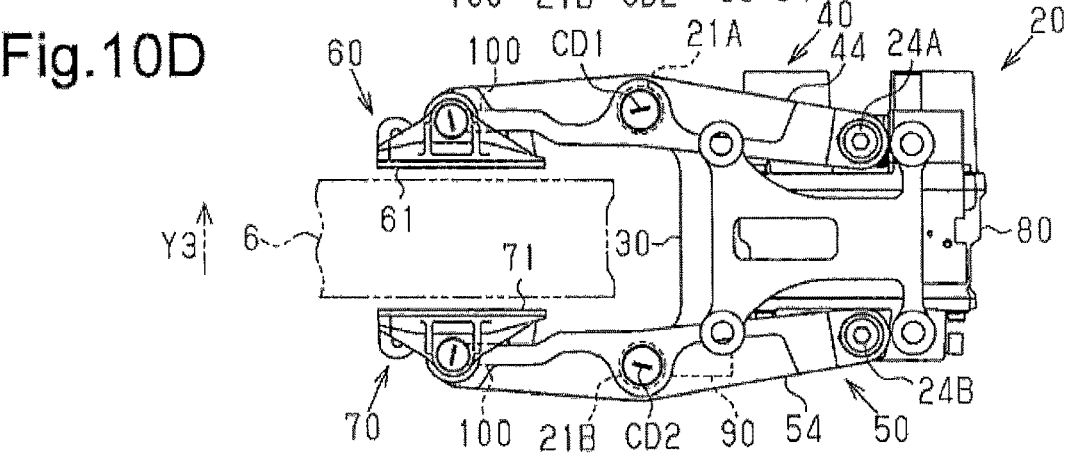

For example, when the disc rotor 6 moves in the direction indicated by the arrow Y3 as shown in FIG. 10D due to the vibration generated while the railroad car 1 travels, and then disc rotor 6 returns to the position of FIG. 10A, the brake shoe 71 of the second brake shoe mount 70 moves away from the disc rotor 6. At the same time, the brake shoe 61 of the first brake shoe mount 60 moves closer to the disc rotor 6 but does not contact the disc rotor 6. In this manner, the brake shoes 71, 61 do not contact the disc rotor 6.

According to the embodiment, the following advantageous effects can be obtained.

(1) In the caliper device 20, the swinging movements of the brake arms 40, 50 are minimized or restricted due to the friction increased by the friction mechanism 90 and thereby it is possible to hold the brake shoes 61, 71 at non-brake positions respectively when braking is not performed. For example it is possible to limit the swinging movement of the brake arms 40, 50 due to the vibration of the railroad car when braking is not performed and thus it is possible to prevent the brake shoes 61, 71 from contacting the disc rotor 6 or the wheel 4 when braking is not performed. The caliper device 20 preferably includes the drive-side friction mechanism 90 and the brake-side friction mechanism 100. In addition to the restriction of the relative movement between the brake arms 40, 50 and the brake shoe mounts 60, 70 with the friction force imparted by the brake-side friction mechanism 100, the swinging movement of the second brake arm 50 is restricted by the friction force imparted by the drive-side friction mechanism 90. In this way it is possible to restrict the swinging movement of the second brake arm 50 around the pivot axis CD2 of the arm pivot shaft 21B due to the vibration caused while the railroad car 1 travels, and it is also possible to restrict the swinging movement of the brake shoe mounts 60, 70 around the pivot axes CB1, CB2 of the brake shoe pivot shafts 22A, 22B. Consequently it is possible to prevent the brake shoes 61, 71 from contacting the disc rotor 6 repeatedly due to the vibration caused while the railroad car 1 travels. Therefore the frequency of the brake shoes 61, 71 contacting the disc rotor 6 can be reduced.

(2) In the caliper device 20, the drive-side friction mechanism 90 is provided on the second brake arm 50 but not provided on the first brake arm 40. This means that the drive-side friction mechanism 90 does not impart the friction force to the first brake arm 40 and the arm pivot shaft 21A so that the swinging movement of the first brake arm 40 is not restricted. Because the drive-side friction mechanism 90 does not applies the friction force to the first brake arm 40, excessive limitation of the swinging movements of the first and second brake arms 40, 50 around the arm pivot shafts 21A, 21B by the drive-side friction mechanism 90 will be prevented. Therefore the brake shoes 61, 71 can smoothly shift from the state where the brake shoes 61, 71 contact with the disc rotor 6 to the state where the brake shoes 61, 71 move away from the disc rotor 6.

(3) In a reference example where the drive-side friction mechanism 90 is disposed closer to the output section with reference to the arm pivot shaft 21B, a sufficient distance between the disc rotor 6 and the arm pivot shaft 21B needs to be secured for a space where the drive-side friction mechanism 90 is disposed in order to avoid interference between the drive-side friction mechanism 90 and the disc rotor 6. Consequently the size of the caliper device may be increased for the reference example.

In this respect, the drive-side friction mechanism 90 according to the embodiment is disposed closer to the input portion of the second brake arm 50 with reference to the arm pivot shaft 21B. Therefore the distance between the disc rotor 6 and the arm pivot shaft 21B is not increased. Consequently it is possible to prevent the increase in the size of the caliper device 20.

(4) The friction mechanism disclosed in the '183 Publication is supported by a supporting shaft attached to a pair of arms. This means that a component for supporting the friction mechanism is provided, which will be nothing to do with the function of the caliper device, and the number of components relating to the friction mechanism is increased.

In this respect, in the caliper device 20 according to the embodiment, the drive-side friction mechanism 90 is supported by the second housing portion 35 formed in the main body 30, and the brake-side friction mechanism 100 is supported by the supporting portions 62, 72 of the brake shoe mounts 60, 70. Therefore components exclusively used for supporting the drive-side friction mechanism 90 and the brake-side friction mechanism 100 are not necessary. Consequently it is possible to prevent increase of the number of components relating to the drive-side friction mechanism 90 and the brake-side friction mechanism 100.

(5) The friction member 93 of the drive-side friction mechanism 90 is pressed against the arm pivot shaft 21B. Therefore, compared to the reference example where the friction member 93 is pressed against the main body 30 and the second brake arm 50, the main body 30 and the second brake arm 50 do not necessarily have configurations where the friction member 93 is pressed on. Accordingly, it is possible to prevent complication of the configurations of the main body 30 and the second brake arm 50.

(6) The friction member 93 may be pressed against the arm pivot shaft 21B by the pressing members 94. Therefore, the frequency of the friction member 93 moving away from the arm pivot shaft 21B is decreased and consequently it is possible to impart the friction force to the arm pivot shaft 21B in the stable manner. Moreover, since the friction member 103 of the brake-side friction mechanism 100 is also pressed against the brake shoe pivot shafts 22A, 22B by the pressing members 104, the advantageous effect same as the drive-side friction mechanism 90 can be obtained for the brake-side friction mechanism 100.

(7) When a foreign substance exists between the friction member 93 and the arm pivot shaft 21B, the friction force generated with the friction member 93 becomes unstable.

However, in the drive-side friction mechanism 90 according to the embodiment, the friction member 93 is disposed in the sealed internal space within the first and second housing portions 34, 35 of the main body 30 so that it is possible to prevent foreign substances from entering between the friction member 93 and the arm pivot shaft 21B. As a result, the friction force generated with the friction member 93 can be stabilized. Moreover, in the brake-side friction mechanism 100, the friction member 103 is also disposed in the sealed internal space within the supporting portions 62, 72 of the brake shoe mounts 60, 70 and the housing portions 63, 73 so that the same advantageous effect as the drive-side friction mechanism 90 can be obtained.

(8) To attach the drive-side friction mechanism 90, after the three pressing members 94 have been attached to the attachment portion 91C of the plug 91, the plug 91 is screwed into the second housing portion 35. Therefore a worker who performs the attachment can easily check the number of the pressing members 94, which was three in the above-described embodiment. Consequently it is possible to prevent the drive-side friction mechanism 90 in which an improper number of the pressing members 94 are provided from being attached to the second housing portion 35. Moreover, since the brake-side friction mechanism 100 is attached in the same manner as the drive-side friction mechanism 90, the same advantageous effect as the drive-side friction mechanism 90 can be obtained.

(9) The plug 91 is disposed in the second housing portion 35 at the position where the first step portion 91D of the plug 91 contacts the step portion 35C of the second housing portion 35. Consequently a worker who performs the assembling does not have to perform adjustment of the position of the plug 91 relative to the second housing portion 35 and therefore it is possible to enhance the assembling efficiency of the drive-side friction mechanism 90. The relationship between the plug 101 of the brake-side friction mechanism 100 and the housing portion 63 is same as the relationship between the plug 91 of the drive-side friction mechanism 90 and the second housing portion 35 so that the same advantageous effect as the drive-side friction mechanism 90 can be obtained for the brake-side friction mechanism 100.

(10) The brake-side friction mechanism 100 is disposed closer to the insertion portions 42, 52 of the brake arms 40, 50 with reference to the brake shoe pivot shafts respectively. Therefore compared to a reference example where the brake-side friction mechanisms 100 are disposed on the opposite side to the insertion portion with reference to the brake shoe pivot shafts 22A, 22B, the brake-side friction mechanisms 100 according to the embodiment can be placed on the inner side of the caliper device 20. Consequently it is possible to prevent the size increase of the caliper device 20.

(11) The friction members 103 of the brake-side friction mechanism 100 are pressed against the brake shoe pivot shafts 22A, 22B respectively. Therefore, compared to a reference example where the friction members 103 are pressed against the brake shoe mounts 60, 70 and/or the first brake arm 40, the friction members 103 according to the embodiment do not necessarily have a configuration to be pressed so that complication of the configurations of the brake shoe mounts 60, 70 and/or the first brake arm 40 is prevented.

(12) The driving mechanism 80 swings the first brake arm 40 around the arm pivot shaft 21A. The second brake arm 50 swings around the arm pivot shaft 21B as the driving mechanism 80 moves. The drive-side friction mechanism 90 is provided in the second brake arm 50. Since the drive-side friction mechanism 90 is not provided in the first brake arm 40 that swings easily compared to the second brake arm 50, the first brake arm 40 can smoothly swing. Therefore the brake shoes 61, 71 can smoothly shift from the state where the brake shoes 61, 71 contact with the disc rotor 6 to the state where the brake shoes 61, 71 move away from the disc rotor 6.

(13) The drive-side friction mechanism 90 is disposed between the pair of arms 51. Compared to a reference example where the drive-side friction mechanism 90 is disposed outside the pair of arms 51, it is possible to reduce the size of the caliper device 20.

(14) In the pressing member attaching step of the drive-side friction mechanism 90 attachment process, the attachment portion 91C protrudes out from the three pressing members 94 when the three pressing members 94 are attached to the attachment portion 91C. Therefore the three pressing members 94 are readily supported by the attachment portion 91C, and consequently a worker who performs the plug attaching step does not have to hold the three pressing members 94 when the plug 91 is attached to the second housing portion 35. Accordingly, it is possible to improve the efficiency of the attachment process of the drive-side friction mechanism 90. The structure and attachment process of the brake-side friction mechanism 100 are same as the drive-side friction mechanism 90 so that the same advantageous effects as the drive-side friction mechanism 90 can be obtained for the brake-side friction mechanism 100.

(15) After the drive-side friction mechanism 90 has been attached to the second housing portion 35, the attachment portion 91C is inserted into the cylindrical portion 93A of the friction member 93. Therefore the three pressing members 94 can be adequately compressed by the plug 91 and the friction member 93. The structure of the brake-side friction mechanism 100 is same as the drive-side friction mechanism 90 so that the same advantageous effects as the drive-side friction mechanism 90 can be obtained for the brake-side friction mechanism 100.

MODIFICATION EXAMPLES

The above-described embodiment is a merely example of the caliper device according to the invention and the disc brake including the same and the description of the embodiment does not intend to limit the invention to the embodiment. As for the caliper device according to the invention and the disc brake including the same, various modifications which will be described below and combinations of two or more modifications which are not contradict to each other will be possible in addition to the above-described embodiment.

Modification Example 1

In the above-described embodiment, the drive-side friction mechanism 90 is disposed closer to the input portion with reference to the insertion portion 52 of the second brake arm 50. However the position of the drive-side friction mechanism 90 is not limited to this. Alternatively the drive-side friction mechanism 90 may be disposed closer to the second brake shoe mount 70 (the disc rotor 6) with reference to the insertion portion 52, closer to the first arm 31B, or on the opposite side to the first arm 31B. Alternatively the drive-side friction mechanism 90 may be disposed outside the pair of arms 51 in the axial direction of the arm pivot shaft 21B.

Modification Example 2

In the above-described embodiment, a single drive-side friction mechanism 90 is provided in the second arm portion 31C of the main body 30. Alternatively more than one drive-side friction mechanism 90 may be provided in the second arm portion 31C.

In the above-described embodiment, the brake-side friction mechanism 100 is provided at one of the pair of the supporting portions 62 and one of the pair of the supporting portions 72 respectively of the brake shoe mounts 60, 70. Alternatively the brake-side friction mechanism 100 may be provided at the other of the pair of the supporting portions 62 and the other of the pair of the supporting portions 72, or at the both of the pair of the supporting portions 62 and the both of the pair of the supporting portions 72. Alternatively the brake-side friction mechanism 100 may be disposed on the tip coupling portions 45, 55.

Modification Example 3

In the above-described embodiment, the brake-side friction mechanism 100 is disposed closer to the insertion portion of the brake arms 40, 50 respectively with reference to the brake shoe pivot shafts 22A, 22B. However the position of the brake-side friction mechanism 100 is not limited to this. For instance, the brake-side friction mechanism 100 may be disposed on the opposite side to the insertion portions of the brake arms 40, 50 with reference to the brake shoe pivot shafts 22A, 22B respectively. Alternatively the brake-side friction mechanism 100 may be disposed opposite to the brake shoe with reference to the brake shoe pivot shafts 22A, 22B respectively. Alternatively the brake-side friction mechanism 100 may be disposed between the pair of arms 41 and the pair of arms 51 in the axial direction of the brake shoe pivot shafts 22A, 22B respectively.

Modification Example 4

In the above-described embodiment, a single brake-side friction mechanism 100 is respectively provided in the brake shoe mounts 60, 70. Alternatively more than one brake-side friction mechanism 100 may be provided in the brake shoe mounts 60, 70 respectively.

Modification Example 5

Although the pressing members 94, 104 are disc springs in the above-described embodiment, other structures or mechanisms may be used instead of the disc springs as long as they can push the friction members 93, 103. For instance, the pressing members 94, 104 may be other springs such as coil springs or elastic/resilient members such as O-rings. Alternatively the pressing members 94, 104 may be formed from a pair of permanent magnets: the first permanent magnet is attached to the attachment portion 91C, 101C of the plugs 91, 101; and the second magnet is attached to the friction members 93, 103 and a side of the second magnet facing the first permanent magnet has a magnetic polarity same as that of the first permanent magnet. In this case, the friction members 93, 103 are each pushed by a repulsive force generated between the first permanent magnet and the second permanent magnet.

Modification Example 6

In the above-embodiment, the magnitude of the friction force generated by the friction mechanism is always increased irrespective of the position of the brake shoe (in other words, a brake position and a non-brake position). In the drive-side friction mechanism 90 and the brake-side friction mechanism 100 described in the embodiment, the friction members 93, 103 may be pressed using an actuator(s) instead of the pressing members 94, 104. One example of the actuator is a ball screw mechanism that includes an electric motor and a ball screw that translates a rotational movement of an output shaft of the electric motor into a displacement in the axial direction of the output shaft. Moreover, the magnitude of the friction force applied to the friction members 93, 103 may be dynamically controlled by controlling the actuator(s) through a controller. For instance, the friction force generated by the friction mechanism may be increased only when the brake shoe is at the non-brake position to keep the brake shoe at the non-brake position and/or the friction force may be increased when the brake shoe is out of the non-brake position to keep or return the brake shoe to the non-brake position. With such a dynamic control, it is possible to prevent or reduce the chances of the brake shoe from reaching the brake position when braking is not performed and/or from moving to the brake position when braking is not performed. Moreover, the surface where the friction surface of the friction member contacts may be partially modified to change the friction coefficient. Alternatively the magnitude of the friction force can be increased or decreased by changing a relative distance between the surface and the friction member by notching a part of the surface that contacts the friction surface of the friction member.

Modification Example 7

The drive-side friction mechanism 90 described in the above-embodiment is attached to the second arm portion 31C of the main body 30 to apply the friction force to the arm pivot shaft 21B. However the position where the drive-side friction mechanism 90 is attached and the member to which the friction force is applied from the drive-side friction mechanism 90 are not limited to these. Alternatively, for example, the following features (A)-(E) are possible. Furthermore, the features (A)-(E) may be appropriately combined to each other.

Figure 11:
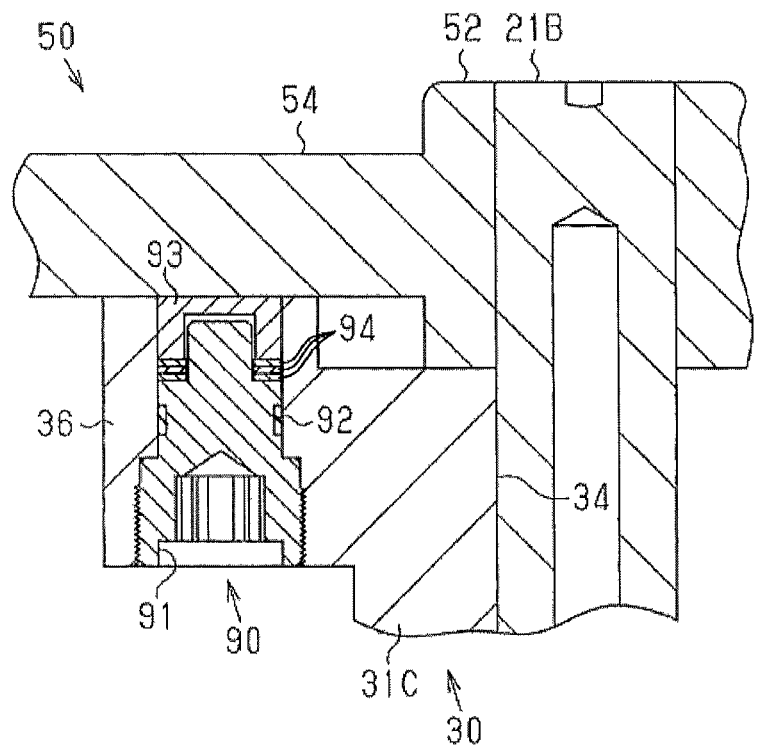
FIG. 11 is a sectional view of the drive-side friction mechanism and components therearound in the caliper device of Modification Example 7(A).

(A) Referring to FIG. 11, the drive-side friction mechanism 90 that is a first drive-side friction mechanism may be attached to a third housing portion 36 that is formed in parallel to the longitudinal direction of the first housing portion 34 at the end portion of the first housing portion 34 in the axial direction of the arm pivot shaft 21B, instead of the second housing portion 35 (see FIG. 6) of the second arm portion 31C of the main body 30. The configuration of the internal space of the third housing portion 36 may be same as that of the second housing portion 35 (see FIG. 6). In this case, the friction member 93 of the drive-side friction mechanism 90 is pressed against the input portion 54 of the second brake arm 50.

Alternatively the drive-side friction mechanism 90 may be disposed on the opposite side (closer to the disc rotor 6 (sec FIG. 3)) to the input portion with reference to the arm pivot shaft 21B. In this case, the friction member 93 of the drive-side friction mechanism 90 is pressed against the output portion 53 of the second brake arm 50 (see FIG. 3). A friction force generated by sliding contact between the friction surface of the friction member 93 and a portion of the brake arm 50 (for example, the input portion 54 or the output portion 53) may be referred to as an arm holding friction force.

Figure 12:
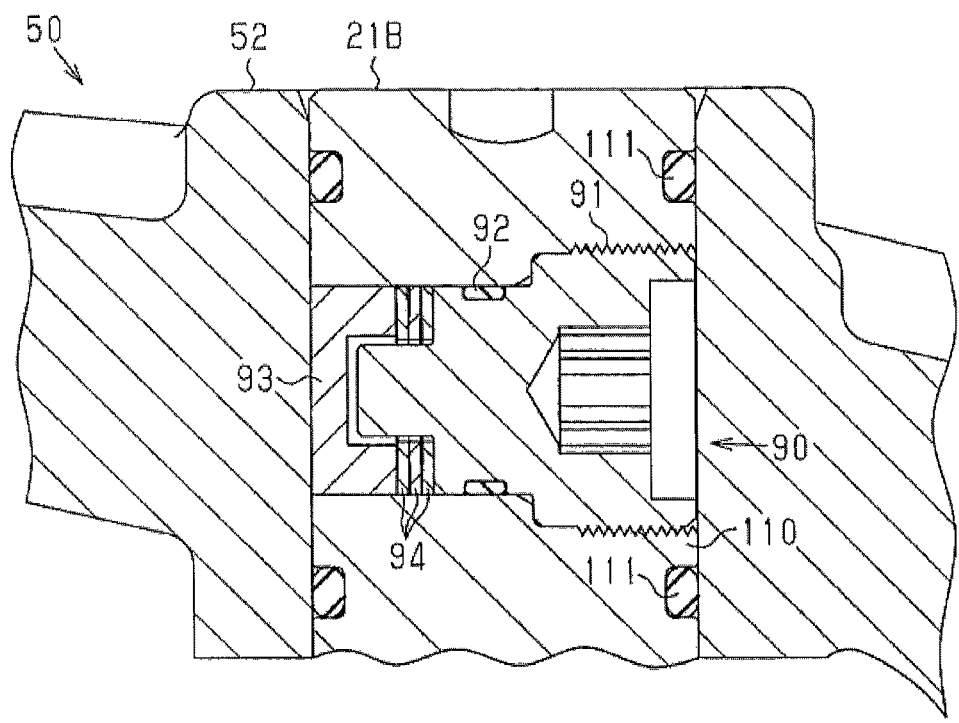
FIG. 12 is a sectional view of the drive-side friction mechanism and components therearound in the caliper device of Modification Example 7(B).

(B) Referring to FIG. 12, the drive-side friction mechanism 90 that is the second drive-side friction mechanism may be attached to a housing portion 110 formed at the end portion of the arm pivot shaft 21B in the axial direction. The configuration of the internal space of the housing portion 110 may be same as that of the second housing portion 35 (see FIG. 6). At each side of the housing portion 110 in the axial direction in the arm pivot shaft 21B, a seal 111 may be provided. The seals 111 may be, for example, O-rings. In this way, the internal space of the housing portion 110 may be sealed. Furthermore, the arm pivot shaft 21B may be unable to revolve relative to the second arm portion 31C (see FIG. 6) and able to revolve relative to the insertion portion 52 of the second brake arm 50. The friction member 93 is pressed against the insertion portion 52 of the second brake arm 50.

Figure 13A:
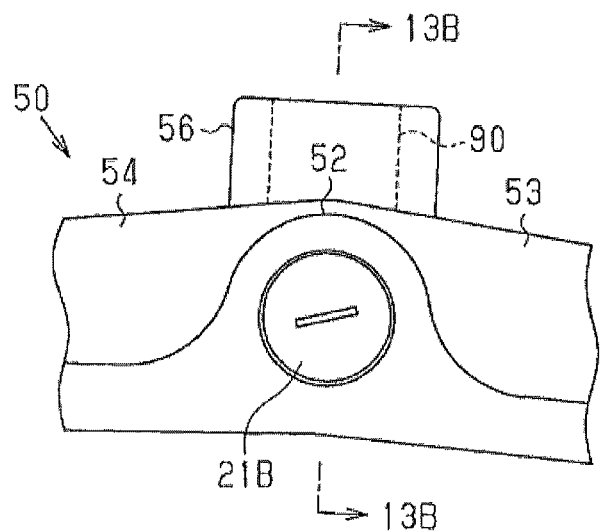
FIG. 13A is a plan view of an insertion portion of a second drive arm and components therearound in the caliper device of Modification Example 7(C) and FIG. 13B is a sectional view of the insertion portion along the line 13B-13B in FIG. 13A.
Figure 13B:
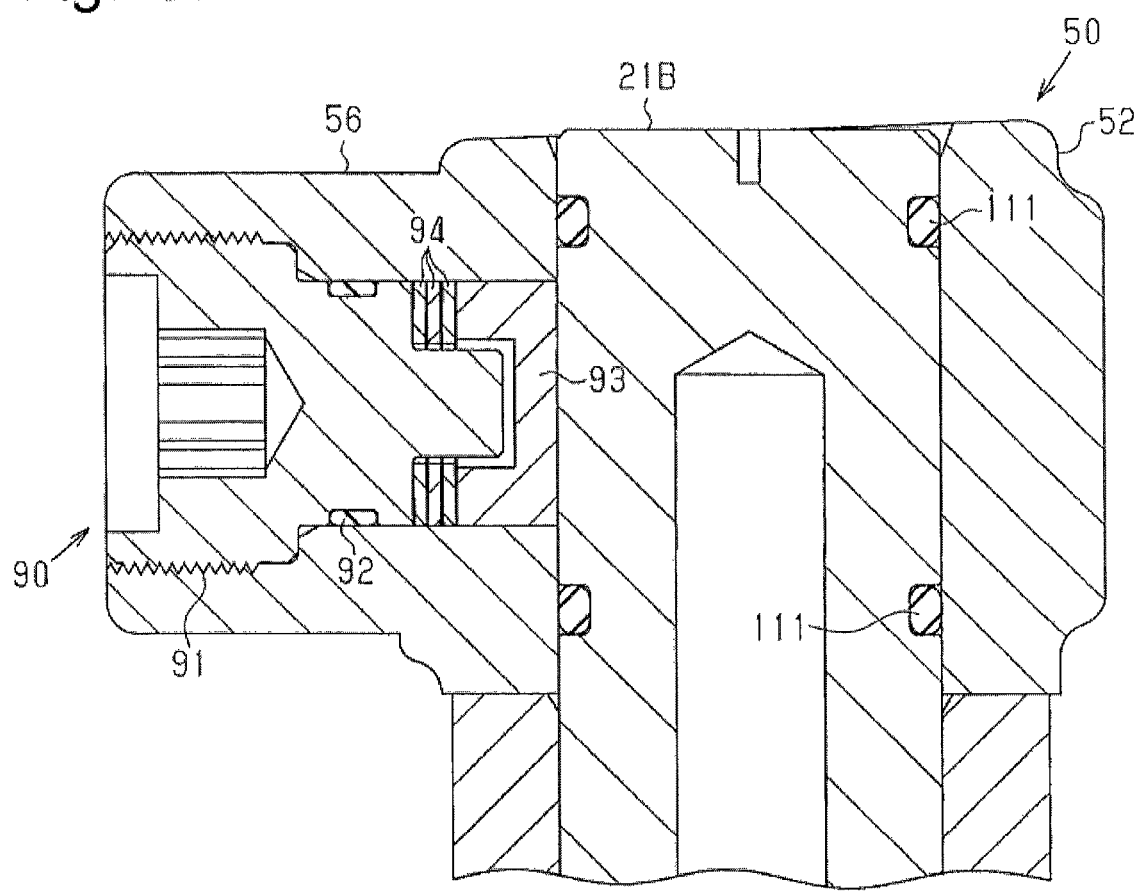

(C) Referring to FIG. 13A, the drive-side friction mechanism 90 that is a second drive-side friction mechanism may be attached to a housing portion 56 formed in the insertion portion 52 of the second brake arm 50. The housing portion 56 may be disposed on the outer side of the caliper device 20 with reference to the arm pivot shaft 21B. Referring to FIG. 13B, the seals 111 may be provided on the arm pivot shaft 21B. The seals 111 may be disposed on each side of the friction member 93 on the arm pivot shaft 21B. The configuration of the internal space of the housing portion 56 may be same as that of the second housing portion 35 (see FIG. 6). Furthermore, the arm pivot shaft 21B may be unable to revolve relative to the second arm portion 31C (see FIG. 6) and able to revolve relative to the insertion portion 52 of the second brake arm 50. The friction member 93 is pressed against the arm pivot shaft 21B.

Figure 14:
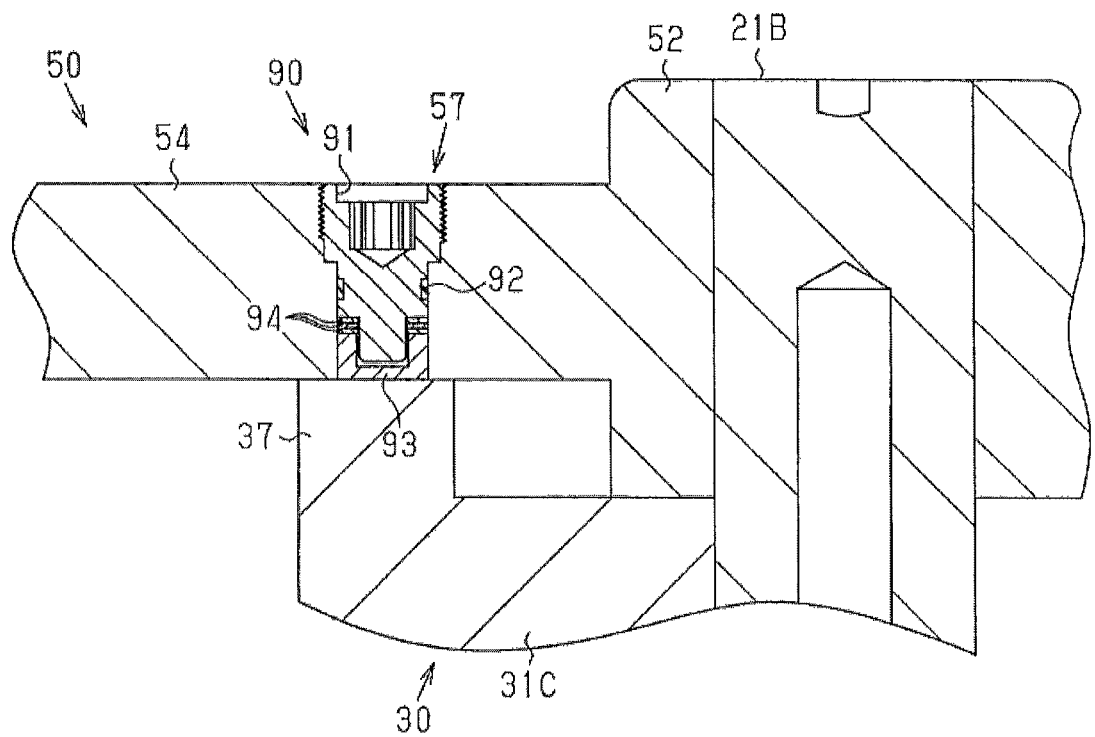
FIG. 14 is a sectional view of the drive-side friction mechanism and components therearound in the caliper device of Modification Example 7(D).

(D) Referring to FIG. 14, the drive-side friction mechanism 90 that is a third drive-side friction mechanism may be attached to a housing portion 57 formed in the input portion 54 of the second brake arm 50. The housing portion 57 may be formed such that it penetrates the input portion 54 in the direction along the axial direction of the arm pivot shaft 21B. The configuration of the internal space of the housing portion 57 may be same as that of the second housing portion 35 (see FIG. 6). An opposing portion 37 that extends toward the housing portion 57 may be formed in the second arm portion 31C. The opposing portion 37 may contact the housing portion 57. The friction member 93 is pressed against the opposing portion 37 of the second arm portion 31C. Alternatively, the housing portion 57 may be formed in the output portion 53 (see FIG. 2). In this case, the opposing portion 37 of the main device 30 extends toward the output portion 53 and contacts the housing portion 57.

Figure 15:
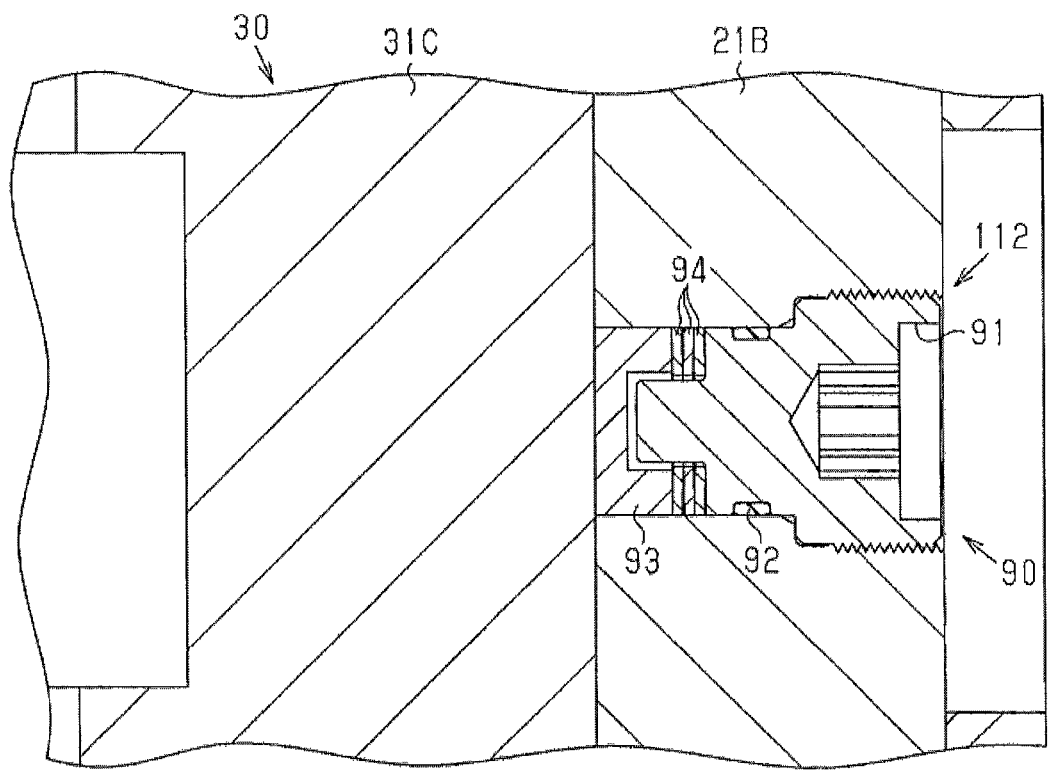
FIG. 15 is a sectional view of the drive-side friction mechanism and components therearound in the caliper device of Modification Example 7(E).

(E) Referring to FIG. 15, the drive-side friction mechanism 90 that is the third drive-side friction mechanism may be attached to a housing portion 112 that is formed in an intermediate portion of the arm pivot shaft 21B in the axial direction (an axially center portion of the arm pivot shaft 21B in FIG. 15). The configuration of the internal space of the housing portion 112 may be same as that of the housing portion 110 (see FIG. 12). The friction member 93 is pressed against the second arm portion 31C of the main body 30. The arm pivot shaft 21B may be able to revolve relative to the second arm portion 31C of the main body 30 but not able to revolve relative to the second brake arm 50.

Modification Example 8

The brake-side friction mechanism 100 described in the above-embodiment is attached to the brake shoe mounts 60, 70 to apply the friction force to the brake shoe pivot shafts 22A, 22B respectively. However the position where the brake-side friction mechanism 100 is attached and the member to which the friction force is applied from the brake-side friction mechanism 100 are not limited to these. Alternatively, for example, the following features (A)-(E) are possible. Furthermore, the features (A)-(E) may be appropriately combined to each other.

Here, the structure of the brake-side friction mechanism 100 provided on the first brake shoe mount 60 is similar to the brake-side friction mechanism 100 provided on the second brake shoe mount 70 so that the brake-side friction mechanism 100 provided on the first brake shoe mount 60 will be mainly described and the description of the brake-side friction mechanism 100 provided on the second brake shoe mount 70 will be omitted. For the sake of simplicity, illustration of the brake shoe mount 60 may be partially omitted in the drawings referred in the following description.

Figure 16:
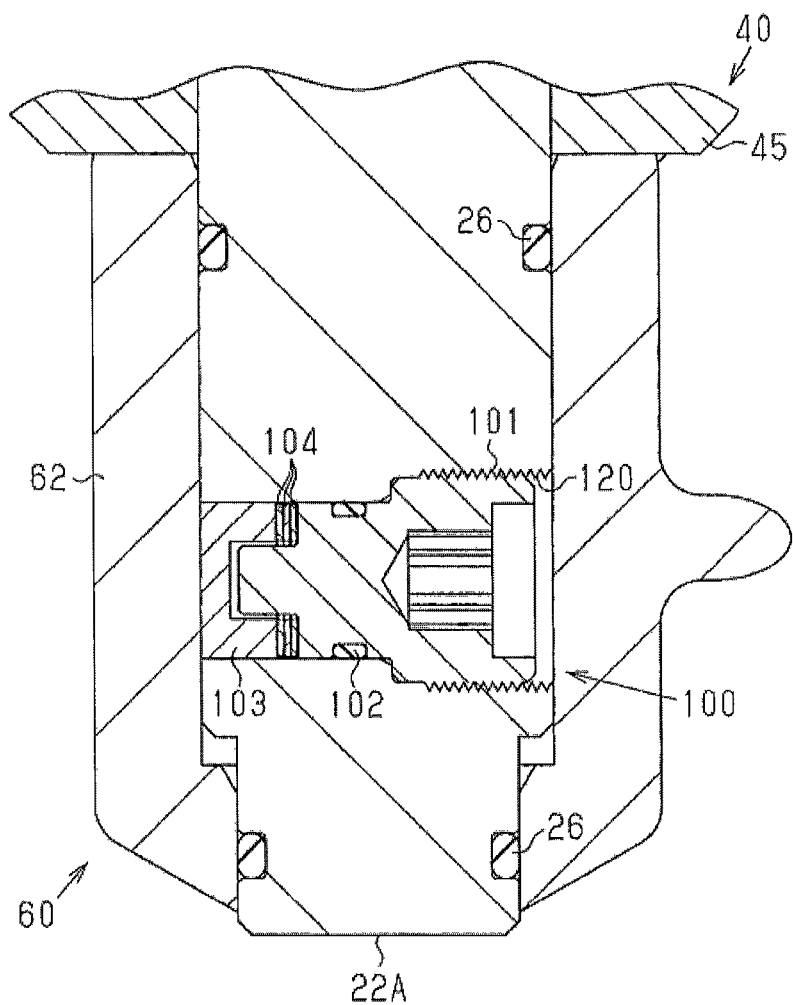
FIG. 16 is a sectional view of the drive-side friction mechanism and components therearound in the caliper device of Modification Example 8(A).

(A) Referring to FIG. 16, the brake-side friction mechanism 100 that is a first brake-side friction mechanism may be attached to a housing portion 120 formed at the end portion of the brake shoe pivot shaft 22A in the axial direction. The configuration of the internal space of the housing portion 120 may be same as that of the housing portion 63 (see FIG. 8). In this case, the friction member 103 of the brake-side friction mechanism 100 is pressed against the supporting portion 62 of the first brake shoe mount 60.

Figure 17:
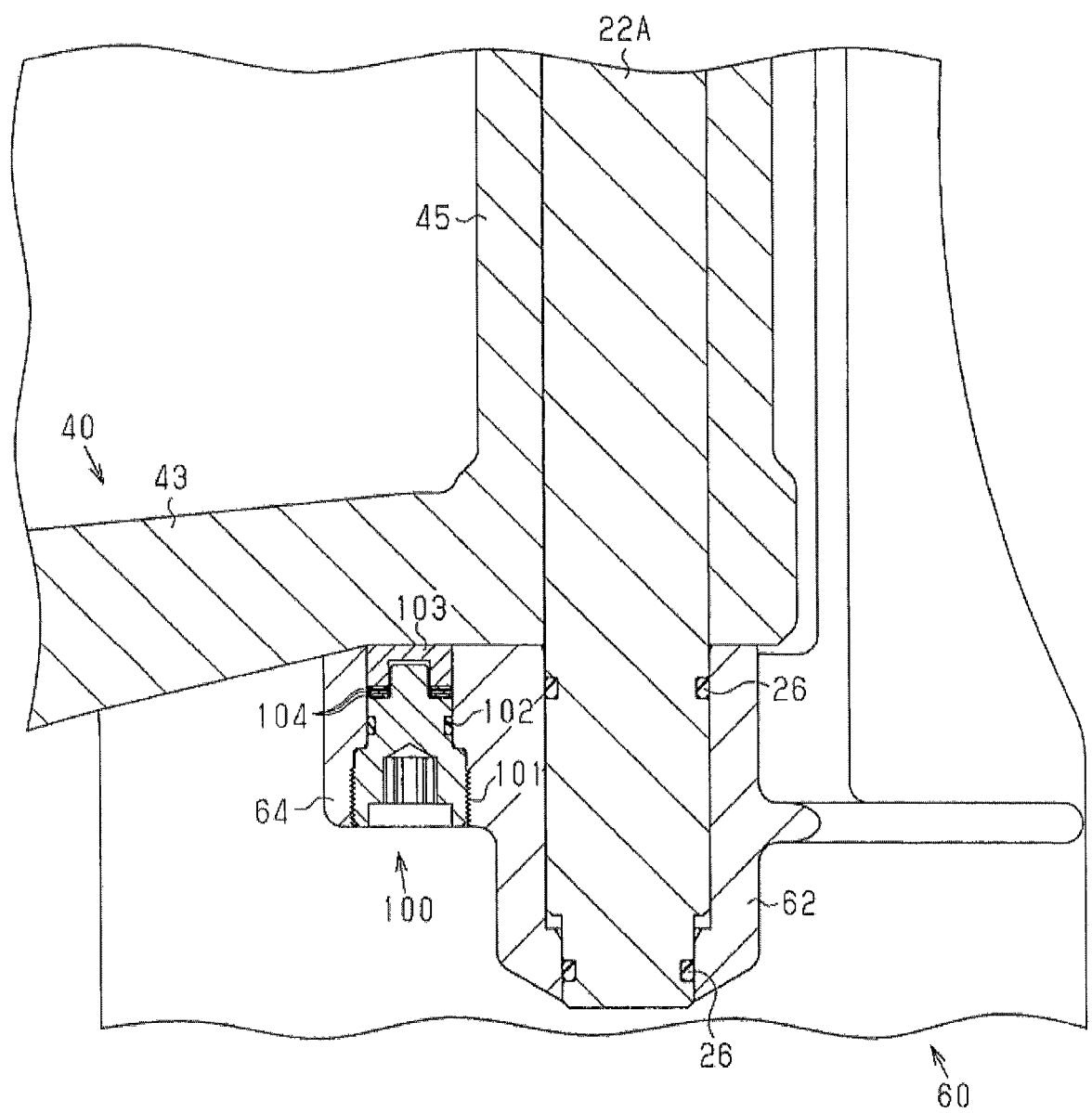
FIG. 17 is a sectional view of the drive-side friction mechanism and components therearound in the caliper device of Modification Example 8(B).

(B) Referring to FIG. 17, the brake-side friction mechanism 100 that is a second brake-side friction mechanism may be attached to a housing portion 64 formed at the end portion of the brake shoe pivot shaft 22A in the axial direction. The housing portion 64 contacts the output portion 43 of the first brake arm 40. The housing portion 64 may be formed in the direction along the axial direction of the brake shoe pivot shaft 22A and the configuration of the housing portion 64 may be same as the housing portion 63 (see FIG. 8). In this case, the friction member 103 of the brake-side friction mechanism 100 is pressed against the output portion 43 of the first brake arm 40.

Figure 18:
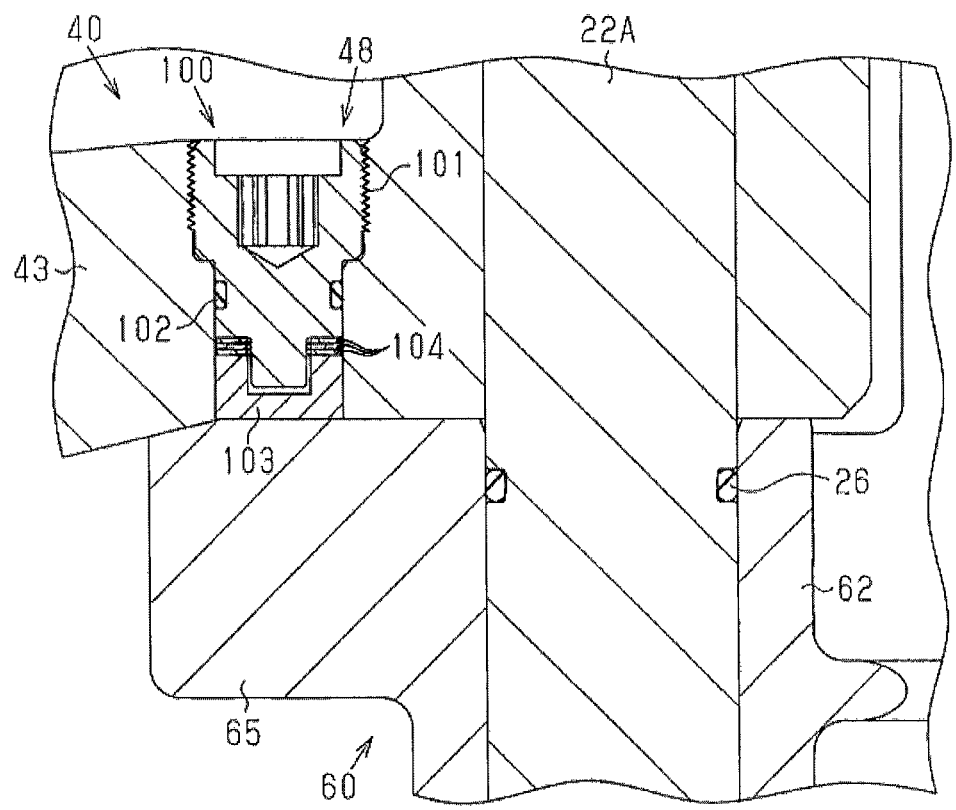
FIG. 18 is a sectional view of the drive-side friction mechanism and components therearound in the caliper device of Modification Example 8(C).

(C) Referring to FIG. 18, the brake-side friction mechanism 100 that is the second brake-side friction mechanism may be attached to a housing portion 48 formed in the output portion 43 of the first brake arm 40. The housing portion 48 may be formed such that it penetrates the output portion 43 in the direction along the axial direction of the brake shoe pivot shaft 22A and the configuration of the housing portion 48 may be same as the housing portion 63 (see FIG. 8). An opposing portion 65 that extends toward the output portion 43 may be formed in the supporting portion 62. The opposing portion 65 contacts the output portion 43. In this case, the friction member 103 of the brake-side friction mechanism 100 is pressed against the opposing portion 65.

Figure 19:
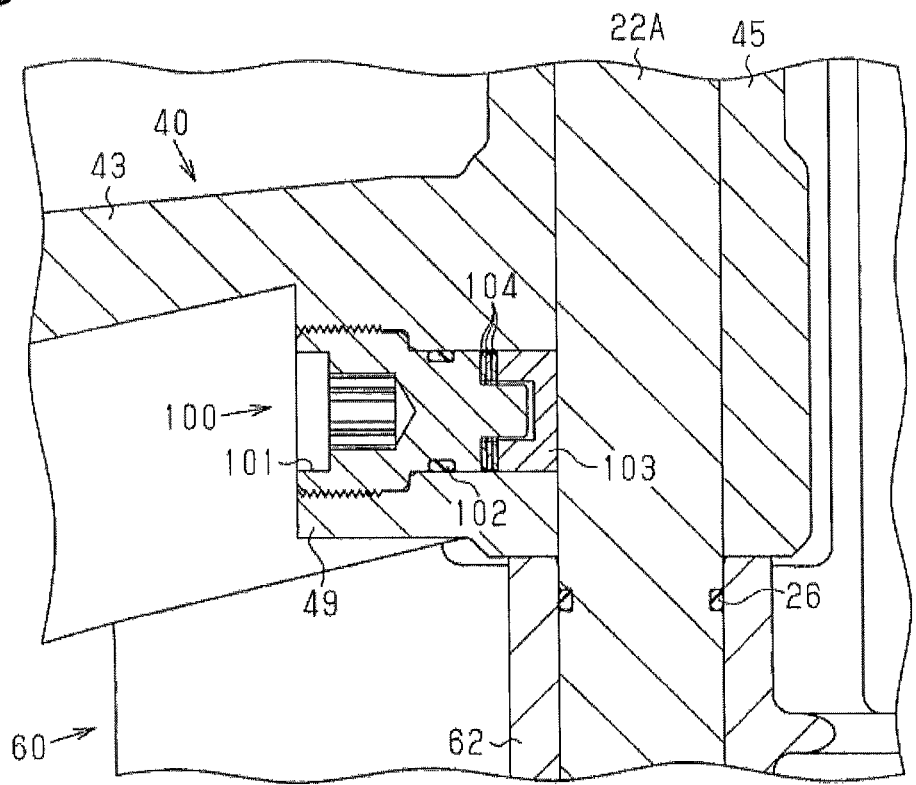
FIG. 19 is a sectional view of the drive-side friction mechanism and components therearound in the caliper device of Modification Example 8(D).

(D) Referring to FIG. 19, the brake-side friction mechanism 100 that is a third brake-side friction mechanism may be attached to a housing portion 49 formed in the output portion 43 of the first brake arm 40. The configuration of the internal space of the housing portion 49 may be same as that of the housing portion 63 (see FIG. 8). In this case, the brake shoe pivot shaft 22A may be unable to revolve relative to the supporting portion 62 and able to revolve relative to the output portion 43. In this case, the friction member 103 of the brake-side friction mechanism 100 is pressed against the brake shoe pivot shaft 22A.

Figure 20:
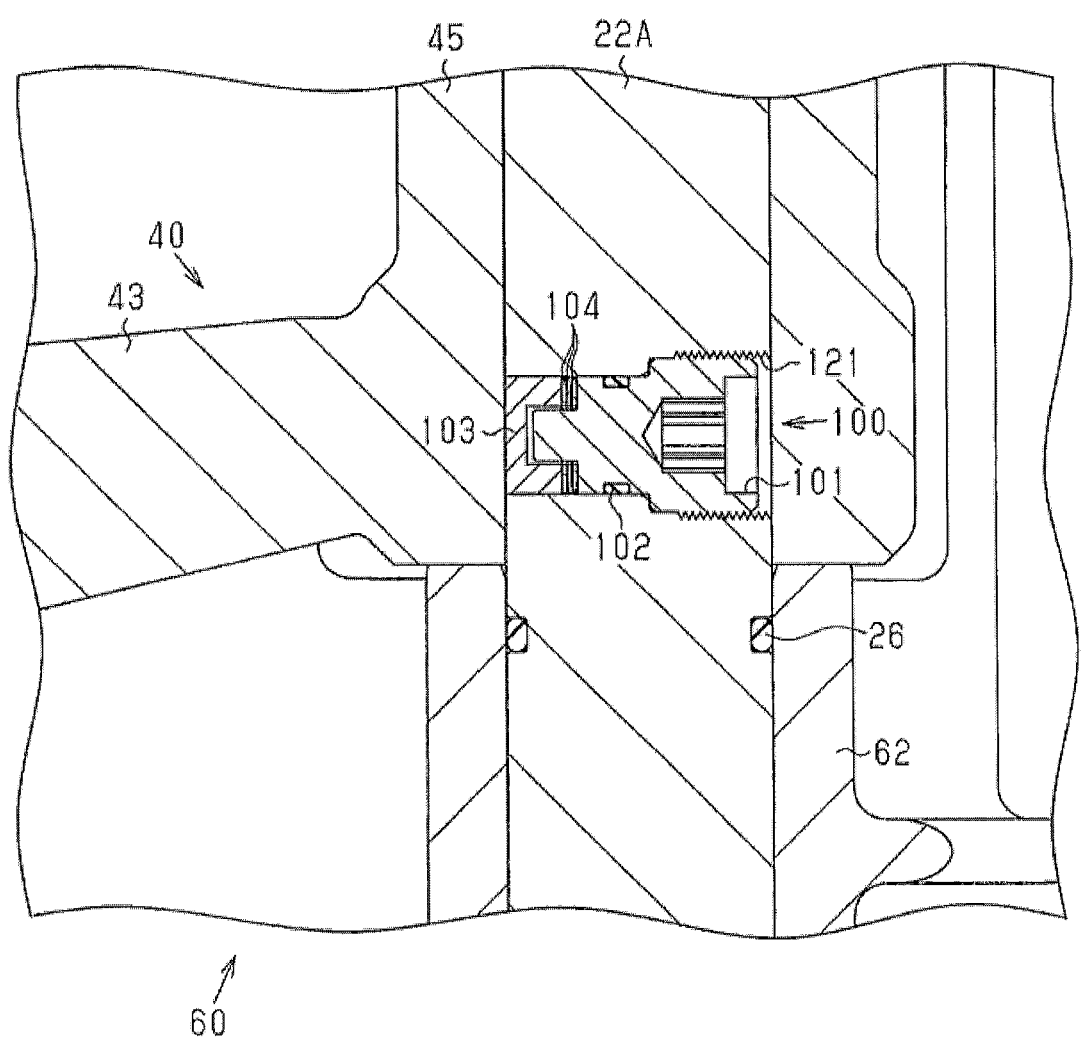
FIG. 20 is a sectional view of the drive-side friction mechanism and components therearound in the caliper device of Modification Example 8(E).

(E) Referring to FIG. 20, the brake-side friction mechanism 100 that is a third brake-side friction mechanism may be attached to a housing portion 121 formed at a portion of the brake shoe pivot shaft 22A that faces the output portion 43. The configuration of the housing portion 121 may be same as that of the housing portion 120 (see FIG. 16). In this case, the brake shoe pivot shaft 22A may be unable to revolve relative to the supporting portion 62 and able to revolve relative to the output portion 43. The friction member 103 is pressed against the output portion 43. Alternatively the housing portion 121 may be formed in a portion of the pivot shaft 22A that faces the tip coupling portion 45 of the first brake arm 40. In this case, the friction member 103 is pressed against the tip coupling portion 45.

Modification Example 9

Instead of the drive-side friction mechanism 90 and the brake-side friction mechanism 100 described in the above embodiment, the friction mechanism described in the '183 Publication may be provided on the second arm portion 31C of the main body 30 and the brake shoe mounts 60, 70. In this case, in the input portion 54 of the second brake arm 50, a drive-side supporting shaft that supports the friction mechanism may be provided such that it extends in parallel with the arm pivot shaft 21B and couples the pair of arms 51. Moreover, in the output portions 43, 53 of the brake arms 40, 50, a brake-side supporting shaft that supports the friction mechanism may be respectively provided such that it extends in parallel with the brake shoe pivot shaft 22A, 22B and couples the pair of arms 41 and the pair of arms 51 respectively.

Modification Example 10

The pressing members 94, 104 may be omitted in the drive-side friction mechanism 90 and the brake-side friction mechanism 100 described in the above embodiment. In this case, the plugs 91, 101 contact the friction members 93, 103 respectively.

Modification Example 11

In the above-described embodiment and Modification Examples 1-7 and 9, the drive-side friction mechanism 90 may be provided on the first brake arm 40 instead of the second brake arm 50.

Modification Example 12

The brake-side friction mechanism 100 may be omitted.

Modification Example 13

The brake arm 40 generates a braking force by pressing the brake shoe 61 against a rotor in order to retard the rotation of the rotor. The rotor may be the disc rotor 6 or the wheel 4. The same applies to the brake arm 50.

It should be apparent to those skilled in the art that the present invention may be embodied in many other specific forms without departing from the scope of the invention. For example, some of the components may be omitted from the components described in the embodiments (or one or more aspects thereof). Further, components in different embodiments may be appropriately combined. The scope of the present invention and equivalence of the present invention are to be understood with reference to the appended claims.

What is claimed is:

1. A caliper device used together with a brake shoe to retard rotation of a rotor, comprising:
a brake arm configured to swing relative to a main body by a driving mechanism, the brake arm configured to move the brake shoe between a brake position and a non-brake position; and
a friction mechanism configured to increase friction against a swinging movement of the brake arm relative to the main body when braking is not performed,
wherein the friction mechanism includes
a friction member housed in a housing portion provided in one of the main body and the brake arm, the friction member being configured to generate an arm holding friction force to impede the swinging movement of the brake arm relative to the main body, and
a plug configured to plug the housing portion,
wherein the brake arm includes
an insertion portion into which an arm pivot shaft supported by the main body is inserted,
an input portion that extends from the insertion portion, and
an output portion that extends from the insertion portion in a direction different from a direction in which the input portion extends,
wherein the driving mechanism is coupled to the input portion to impart a drive force to the input portion,
wherein the output portion is coupled to a brake shoe mount through a brake shoe pivot shaft that has a pivot axis, the brake shoe is attached to the brake shoe mount,
wherein the friction mechanism is a drive-side friction mechanism that applies a friction force to at least one selected from the group consisting of the input portion, the insertion portion, the output portion, the main body and the arm pivot shaft,
wherein the caliper device further comprising: a brake-side friction mechanism different from the drive-side friction mechanism, the brake-side friction mechanism applying a friction force to at least one selected from the group consisting of the output portion, the brake shoe pivot shaft, and the brake shoe mount, and
wherein the brake-side friction mechanism is disposed closer to the insertion portion with reference to the brake shoe pivot shaft than the input portion.

2. A caliper device used together with a brake shoe to retard rotation of a rotor, comprising:
a brake arm configured to swing relative to a main body by a driving mechanism, the brake arm configured to move the brake shoe between a brake position and a non-brake position; and
a friction mechanism configured to increase friction against a swinging movement of the brake arm relative to the main body when braking is not performed,
wherein the friction mechanism includes
a friction member housed in a housing portion provided in one of the main body and the brake arm, the friction member being configured to generate an arm holding friction force to impede the swinging movement of the brake arm relative to the main body, and
a plug configured to plug the housing portion,
wherein the brake arm includes
an insertion portion into which an arm pivot shaft supported by the main body is inserted,
an input portion that extends from the insertion portion, and
an output portion that extends from the insertion portion in a direction different from a direction in which the input portion extends,
wherein the driving mechanism is coupled to the input portion to impart a drive force to the input portion,
wherein the output portion is coupled to a brake shoe mount through a brake shoe pivot shaft that has a pivot axis, the brake shoe is attached to the brake shoe mount,
wherein the friction mechanism is a drive-side friction mechanism that applies a friction force to at least one selected from the group consisting of the input portion, the insertion portion, the output portion, the main body and the arm pivot shaft,
wherein the caliper device further comprising: a brake-side friction mechanism different from the drive-side friction mechanism, the brake-side friction mechanism applying a friction force to at least one selected from the group consisting of the output portion, the brake shoe pivot shaft, and the brake shoe mount, and
wherein the brake-side friction mechanism includes a friction member that is pressed against the brake shoe pivot shaft.

3. The caliper device of claim 2, wherein the brake-side friction mechanism further includes a pressing member that presses the friction member of the brake-side friction mechanism against the brake shoe pivot shaft.

4. The caliper device of claim 2, wherein the friction member of the brake-side friction mechanism is supported and housed in a housing portion formed in the brake shoe mount or the brake arm, and
wherein the brake-side friction mechanism further includes a plug that is inserted into the housing portion of the brake-side friction mechanism and is configured to plug the housing portion of the brake-side friction mechanism.

5. The caliper device of claim 4, wherein the brake-side friction mechanism further includes a pressing member that presses the friction member of the brake-side friction mechanism against the brake shoe pivot shaft, and
wherein the plug of the brake-side friction mechanism has an attachment portion where the pressing member of the brake-side friction mechanism is attached.

6. The caliper device of claim 4, wherein the housing portion of the brake-side friction mechanism includes a step portion that contacts the plug of the brake-side friction mechanism in a direction in which the plug of the brake-side friction mechanism is inserted.

* * * * *